(12) United States Patent
Ishii

(10) Patent No.: US 7,171,504 B2
(45) Date of Patent: Jan. 30, 2007

(54) TRANSMISSION UNIT

(75) Inventor: Yusuke Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 244 days.

(21) Appl. No.: 10/097,209

(22) Filed: Mar. 13, 2002

(65) Prior Publication Data

US 2003/0065814 A1    Apr. 3, 2003

(30) Foreign Application Priority Data

Oct. 3, 2001    (JP)    ............................. 2001-307445

(51) Int. Cl.
   *G06F 13/14*    (2006.01)
(52) U.S. Cl. ...................... 710/305; 710/306; 710/316; 710/317; 709/239
(58) Field of Classification Search ................ 710/104, 710/316–317; 709/239; 370/217
   See application file for complete search history.

(56) References Cited

U.S. PATENT DOCUMENTS

| 2002/0154606 | A1* | 10/2002 | Duncan et al. | ............. | 370/256 |
| 2002/0181412 | A1* | 12/2002 | Shibasaki | ................... | 370/256 |
| 2003/0037162 | A1* | 2/2003 | Kotser | ........................ | 709/236 |
| 2003/0210685 | A1* | 11/2003 | Foster et al. | ................ | 370/389 |
| 2004/0062209 | A1* | 4/2004 | Goldman et al. | ........... | 370/256 |

FOREIGN PATENT DOCUMENTS

JP    11-008646    1/1999

OTHER PUBLICATIONS

Japanese Office Actiond dated Jan. 17, 2006 with partial translation.

* cited by examiner

Primary Examiner—Rehana Perveen
Assistant Examiner—Kim T. Huynh
(74) Attorney, Agent, or Firm—Katten Muchin Rosenman LLP

(57) ABSTRACT

A transmission unit that improves communication quality by making effective use of a line to a blocked port in compliance with a spanning tree protocol. Bridges have bridge ports and communicate at the layer 2 level. Physical ports are used for sending and receiving frames via lines. A bridge port state monitoring section monitors the state of ports. A port correspondence table managing section stores and manages a port correspondence table including the state of the bridge ports and the correspondence between the bridge ports and the physical ports in the unit and the correspondence between bridge ports and physical ports in an opposite unit. A switching section switches bridge ports and physical ports on the basis of the port correspondence table so that a line disconnected logically can be used for providing other communication services. A port state management control section sends and receives port state information.

12 Claims, 31 Drawing Sheets

| PORT CORRESPONDENCE TABLE T | | | | | | | |
|---|---|---|---|---|---|---|---|
| INFORMATION REGARDING UNIT | | | | | | INFORMATION REGARDING OPPOSITE UNIT | |
| PHYSICAL PORT ID | NEW BRIDGE ID | NEW BRIDGE PORT ID | BRIDGE PORT STATE | ORIGINAL BRIDGE ID | ORIGINAL BRIDGE PORT ID | PHYSICAL PORT ID | BRIDGE ID | BRIDGE PORT ID |
| ---- | ---- | ---- | ---- | ---- | ---- | ---- | ---- | ---- |

FIG. 8

FIG. 10(A) — T1A PORT CORRESPONDENCE TABLE

| | INFORMATION REGARDING UNIT A | | | | | | INFORMATION REGARDING UNIT B | | |
|---|---|---|---|---|---|---|---|---|---|
| | PHYSICAL PORT ID | NEW BRIDGE ID | NEW BRIDGE PORT ID | BRIDGE PORT STATE | ORIGINAL BRIDGE ID | ORIGINAL BRIDGE PORT ID | PHYSICAL PORT ID | BRIDGE ID | BRIDGE PORT ID |
| #1 | A-1 | a | Aa-1 | No-blk | a | Aa-1 | B-1 | c | Bc-1 |
| #2 | A-2 | b | Ab-1 | No-blk | b | Ab-1 | B-2 | d | Bd-1 |

FIG. 10(B) — T1B PORT CORRESPONDENCE TABLE

| | INFORMATION REGARDING UNIT B | | | | | | INFORMATION REGARDING UNIT A | | |
|---|---|---|---|---|---|---|---|---|---|
| | PHYSICAL PORT ID | NEW BRIDGE ID | NEW BRIDGE PORT ID | BRIDGE PORT STATE | ORIGINAL BRIDGE ID | ORIGINAL BRIDGE PORT ID | PHYSICAL PORT ID | BRIDGE ID | BRIDGE PORT ID |
| #1 | B-1 | c | Bc-1 | No-blk | c | Bc-1 | A-1 | a | Aa-1 |
| #2 | B-2 | d | Bd-1 | No-blk | d | Bd-1 | A-2 | b | Ab-1 |

FIG. 12(A) T2A PORT CORRESPONDENCE TABLE

| | INFORMATION REGARDING UNIT A | | | | INFORMATION REGARDING UNIT B | | |
|---|---|---|---|---|---|---|---|
| PHYSICAL PORT ID | NEW BRIDGE ID | NEW BRIDGE PORT ID | BRIDGE PORT STATE | ORIGINAL BRIDGE ID | ORIGINAL BRIDGE PORT ID | PHYSICAL PORT ID | BRIDGE ID | BRIDGE PORT ID |
| #1 A-1 | a | Aa-1 | blk | a | Aa-1 | B-1 | c | Bc-1 |
| #2 A-2 | b | Ab-1 | No-blk | b | Ab-1 | B-2 | d | Bd-1 |

FIG. 12(B) T2B PORT CORRESPONDENCE TABLE

| | INFORMATION REGARDING UNIT B | | | | INFORMATION REGARDING UNIT A | | |
|---|---|---|---|---|---|---|---|
| PHYSICAL PORT ID | NEW BRIDGE ID | NEW BRIDGE PORT ID | BRIDGE PORT STATE | ORIGINAL BRIDGE ID | ORIGINAL BRIDGE PORT ID | PHYSICAL PORT ID | BRIDGE ID | BRIDGE PORT ID |
| #1 B-1 | c | Bc-1 | No-blk | c | Bc-1 | A-1 | a | Aa-1 |
| #2 B-2 | d | Bd-1 | No-blk | d | Bd-1 | A-2 | b | Ab-1 |

FIG. 14(A) — T3A PORT CORRESPONDENCE TABLE

|   | INFORMATION REGARDING UNIT A ||||| INFORMATION REGARDING UNIT B |||
|---|---|---|---|---|---|---|---|
| PHYSICAL PORT ID | NEW BRIDGE ID | NEW BRIDGE PORT ID | BRIDGE PORT STATE | ORIGINAL BRIDGE ID | ORIGINAL BRIDGE PORT ID | PHYSICAL PORT ID | BRIDGE ID | BRIDGE PORT ID |
| #1 A-1 | a | Aa-1 | blk | a | Aa-1 | B-1 | c | Bc-1 |
| #2 A-2 | b | Ab-1 | No-blk | b | Ab-1 | B-2 | d | Bd-1 |

FIG. 14(B) — T3B PORT CORRESPONDENCE TABLE

|   | INFORMATION REGARDING UNIT B ||||| INFORMATION REGARDING UNIT A |||
|---|---|---|---|---|---|---|---|
| PHYSICAL PORT ID | NEW BRIDGE ID | NEW BRIDGE PORT ID | BRIDGE PORT STATE | ORIGINAL BRIDGE ID | ORIGINAL BRIDGE PORT ID | PHYSICAL PORT ID | BRIDGE ID | BRIDGE PORT ID |
| #1 B-1 | d | Bd-1 | No-blk | c | Bc-1 | A-1 | a | Aa-1 |
| #2 B-2 | d | Bd-1 | No-blk | d | Bd-1 | A-2 | b | Ab-1 |

FIG. 16(A)

T4A PORT CORRESPONDENCE TABLE

| | INFORMATION REGARDING UNIT A | | | | | INFORMATION REGARDING UNIT B | | |
|---|---|---|---|---|---|---|---|---|
| | PHYSICAL PORT ID | NEW BRIDGE ID | NEW BRIDGE PORT ID | BRIDGE PORT STATE | ORIGINAL BRIDGE ID | ORIGINAL BRIDGE PORT ID | PHYSICAL PORT ID | BRIDGE ID | BRIDGE PORT ID |
| #1 | A-1 | b | Ab-1 | blk | a | Aa-1 | B-1 | c | Bc-1 |
| #2 | A-2 | b | Ab-1 | No-blk | b | Ab-1 | B-2 | d | Bd-1 |

FIG. 16(B)

T4B PORT CORRESPONDENCE TABLE

| | INFORMATION REGARDING UNIT A | | | | | INFORMATION REGARDING UNIT A | | |
|---|---|---|---|---|---|---|---|---|
| | PHYSICAL PORT ID | NEW BRIDGE ID | NEW BRIDGE PORT ID | BRIDGE PORT STATE | ORIGINAL BRIDGE ID | ORIGINAL BRIDGE PORT ID | PHYSICAL PORT ID | BRIDGE ID | BRIDGE PORT ID |
| #1 | B-1 | d | Bd-1 | No-blk | c | Bc-1 | A-1 | a | Aa-1 |
| #2 | B-2 | d | Bd-1 | No-blk | d | Bd-1 | A-2 | b | Ab-1 |

PRIORITY/UPPER ASSIGNED BAND LIMIT SETTING TABLE

| BRIDGE ID | BRIDGE PORT ID | PRIORITY | UPPER ASSIGNED BAND LIMIT |
|---|---|---|---|
| ---- | ---- | ---- | ---- |

FIG. 17

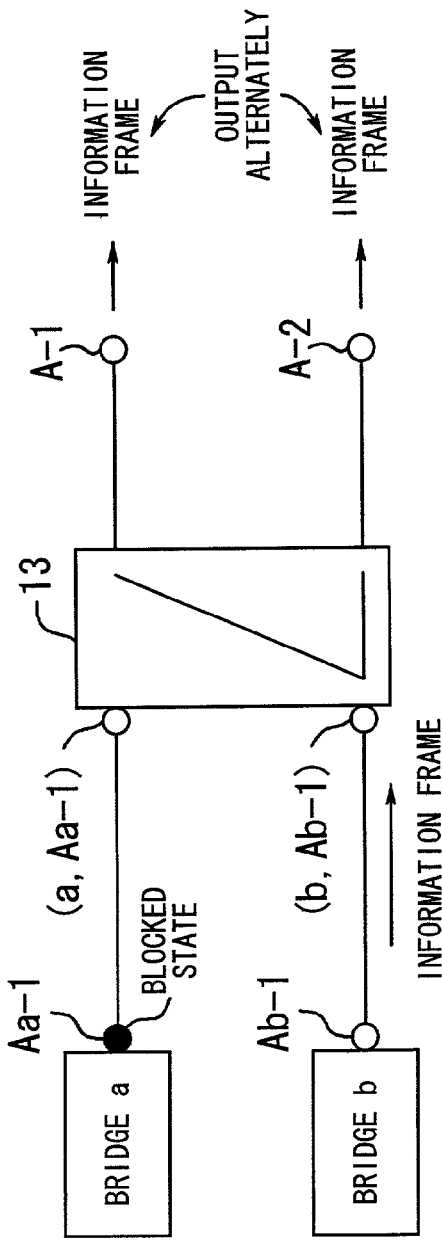

TRANSMISSION UNIT

BACKGROUND OF THE INVENTION (1) Field of the Invention

This invention relates to a transmission unit and, more particularly, to a transmission unit for exercising transmission control over multiple bridges on a network.

(2) Description of the Related Art

In recent years transmission units having the bridge function of interconnecting multiple sites have been developed with the spread of the Internet. The scale and use of networks are extensively increased by the use of these transmission units.

Bridges operate at the layer 2 (data link layer) level and relay frames. (With Ethernet, these bridges can interpret Ethernet headers including a MAC address.) These bridges also function as basic interfaces with routers, switches, and the like.

Many of specifications for bridges are conformable to IEEE802.1D in which a spanning tree protocol is defined. This spanning tree protocol is used for avoiding frame congestion (circulation) caused by a loop by detecting a loop on a network, disconnecting the loop logically at a point (creating a blocked state), and forming a tree structure.

FIGS. 29 through 31 are views for giving an overview of a spanning tree protocol. Each of bridges a through c has bridge ID. It is assumed that the bridge IDs of the bridges a through c are 1, 2, and 3 respectively and that communication line speeds between the bridges a and b, between the bridges b and c, and between the bridges a and c are 100, 10, and 10 Mbps respectively.

First the bridges a through c exchange data called a bridge protocol data unit (BPDU) between them to recognize each other's bridge ID. Then a bridge with the smallest bridge ID will be selected as a root bridge. FIG. 30 indicates that the bridge a is selected as a root bridge.

After a root bridge is selected, designated ports (DP) and root ports (RP) are determined. A DP is the nearest port to the root bridge in each segment. The nearest port to the root bridge on each bridge is selected as an RP. These DPs and RPs are not blocked.

The segment between the bridges a and b will now be described with reference to FIG. 31. The nearest port to the root bridge (bridge a) is port #1 on the bridge a (because it connects directly with the root bridge). Similarly, between the bridges a and c, the nearest port to the root bridge is port #2 on the bridge a (because it also connects directly with the root bridge). Both ports #1 and #2 on the bridge a therefore are selected as DPs.

Of ports #1 and #2 on the bridge b, the port #1 is the nearer to the root bridge. Of ports #1 and #2 on the bridge c, the port #1 is the nearer to the root bridge. The port #1 on the bridge b and the port #1 on the bridge c therefore are selected as RPs.

The segment between the bridges b and c will now be described. The communication line speeds between the bridges a and b and between the bridges a and c are 100 and 10 Mbps respectively, so the segment between the bridges a and b is the shorter way to the root bridge. The port #2 on the bridge b therefore is a DP. The remaining port #2 on the bridge c which is not a DP or RP will be blocked. Blocking this port eliminates the loop structure of the entire network.

If there is a loop on a network, the loop structure will be eliminated in this way by the function of the spanning tree protocol.

The above conventional transmission units with a bridge function and IEEE802.1D, being a standard for them, are intended for the LAN. Therefore, even if a line is disconnected logically in compliance with a spanning tree protocol, the use of the disconnected line is not taken into consideration because the cost of that line is comparatively low.

However, lines forming a wide area network, such as a carrier network, are usually expensive and very valuable. If a line between transmission units with a bridge function used on such a carrier network is disconnected logically in compliance with a spanning tree protocol, it cannot be used for data transmission. This means a great waste and causes degradation in communication quality.

SUMMARY OF THE INVENTION

In order to address such problems, the present invention was made. In other words, an object of the present invention is to provide a transmission unit which makes effective use of a line to a port blocked in compliance with a spanning tree protocol and improves communication quality.

In order to achieve the above object, a transmission unit for exercising transmission control on a network is provided. This transmission unit comprises bridges with bridge ports for communicating at the layer 2 level, physical ports for sending and receiving frames via lines, and an inter-port switching control section including a bridge port state monitoring section for monitoring the blocked or non-blocked state of the bridge ports, a port correspondence table managing section for storing and managing a port correspondence table including the state of the bridge ports and the correspondence between the bridge ports and the physical ports in the unit and the correspondence between bridge ports and physical ports in an opposite unit, a switching section for switching the bridge ports and the physical ports so as to be able to use a line disconnected logically for providing other communication services by sending frames sent from the bridge ports from the corresponding physical ports and transferring frames received at the physical ports to the corresponding bridge ports on the basis of the port correspondence table, and a port state management control section for sending and receiving port state information to exchange information with the opposite unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 is a view showing the structure of a port correspondence table.

FIGS. 10(A) and 10(B) are views showing a port correspondence table corresponding to the state 1, FIG. 10(A) showing a port correspondence table for a transmission unit A, and FIG. 10(B) showing a port correspondence table for a transmission unit B.

FIGS. 12(A) and 12(B) are views showing a port correspondence table corresponding to the state 2, FIG. 12(A) showing a port correspondence table for the transmission unit A, and FIG. 12(B) showing a port correspondence table for the transmission unit B.

FIGS. 14(A) and 14(B) are views showing a port correspondence table corresponding to the state 3, FIG. 14(A) showing a port correspondence table for the transmission unit A, and FIG. 14(B) showing a port correspondence table for the transmission unit B.

FIGS. 16(A) and 16(B) are views showing a port correspondence table corresponding to the state 4, FIG. 16(A) showing a port correspondence table for the transmission unit A, and FIG. 16(B) showing a port correspondence table for the transmission unit B.

FIG. 17 is a view showing a priority setting table.

FIGS. 22(A) and 22(B) are views for describing steps S15 through S18 shown in FIG. 20.

DESCRIPTION OF THE PREFERRED EMBODIMENTS

Figure 1:
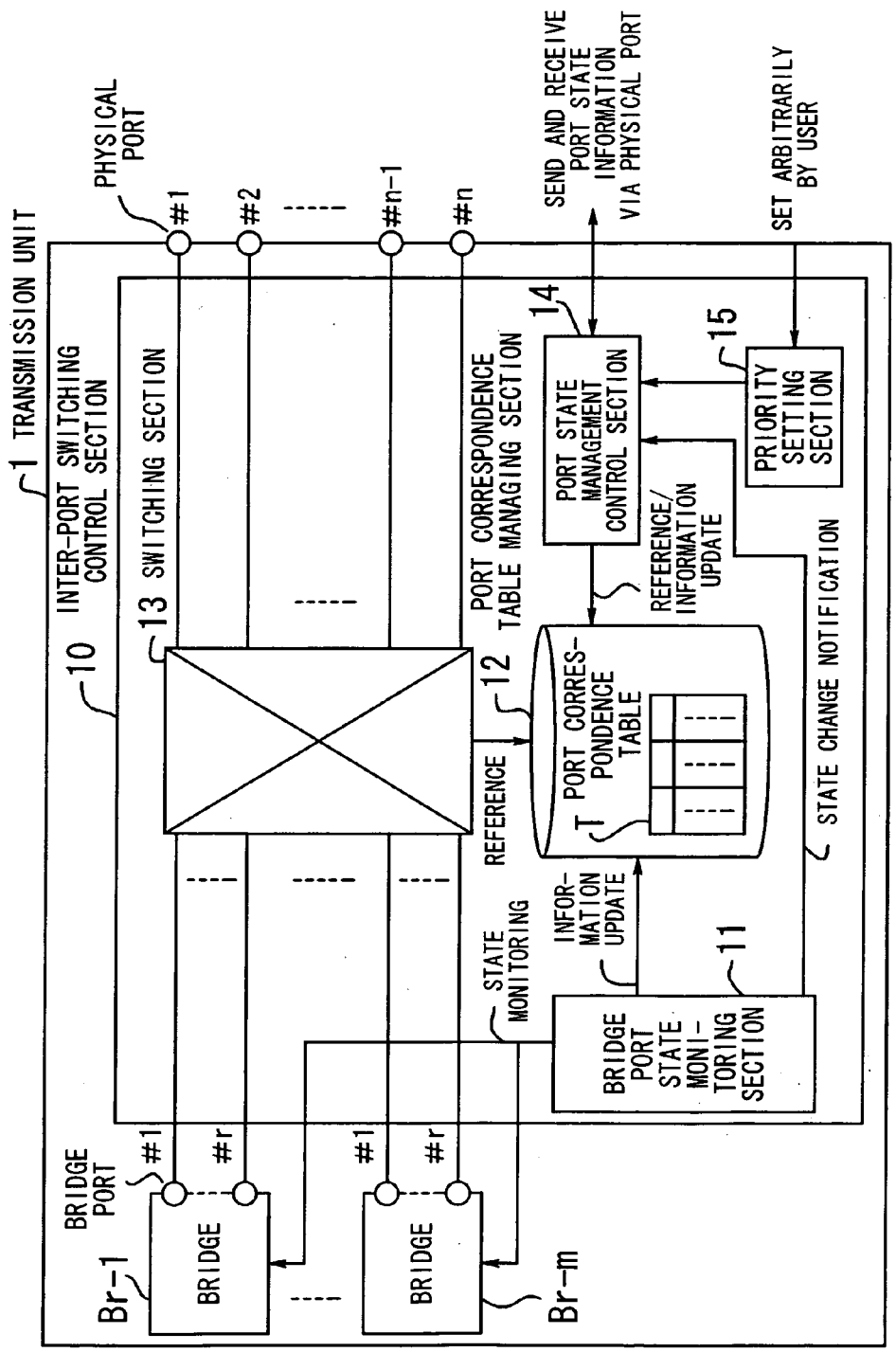
FIG. 1 is a view for describing the principles underlying a transmission unit according to the present invention.

Embodiments of the present invention will now be described with reference to the drawings. FIG. 1 is a view for describing the principles underlying a transmission unit according to the present invention. A transmission unit 1 is a unit for exercising transmission control over multiple bridges on a network of a point-to-point type.

Each of bridges Br-1 through Br-m communicates at the layer 2 level and has bridge ports #1 through #r. If there is a loop on a network, the spanning tree protocol for avoiding frame congestion by throwing a bridge port into a blocked state which is defined in IEEE802.1D will be applied to the bridges Br-1 through Br-m.

An inter-port switching control section (inter-port switching unit) 10 includes a bridge port state monitoring section 11, a port correspondence table managing section 12, a switching section 13, a port state management control section 14, and a priority setting section 15.

The bridge port state monitoring section 11 monitors the blocked or non-blocked state of bridge ports by polling.

The port correspondence table managing section 12 stores and manages a port correspondence table T including the state of bridge ports and correspondence between the bridge ports and physical ports (#1 through #n which send or receive a frame via a line) in the unit and the correspondence between bridge ports and physical ports in an opposite unit.

By sending a frame sent from a bridge port from the corresponding physical port and transferring a frame received by a physical port to the corresponding bridge port on the basis of the port correspondence table T, the switching section 13 switches between bridge ports and physical ports so that a line logically disconnected can be used for providing other communication services.

To exchange information with an opposite unit, the port state management control section 14 generates port state information and exchanges port state information between the unit and the opposite unit. Port state information includes a state notification frame, switching request frame, and response frame described later. The priority setting section 15 sets the priority and upper assigned band limits for bridge ports. A user can arbitrarily set priority and the upper limit of an assigned band.

The port correspondence table managing section 12 updates information on the basis of the result of monitoring by the bridge port state monitoring section 11 and port state information regarding an opposite unit received by the port state management control section 14 to generate port correspondence table T indicative of a new correspondence.

Figure 2:
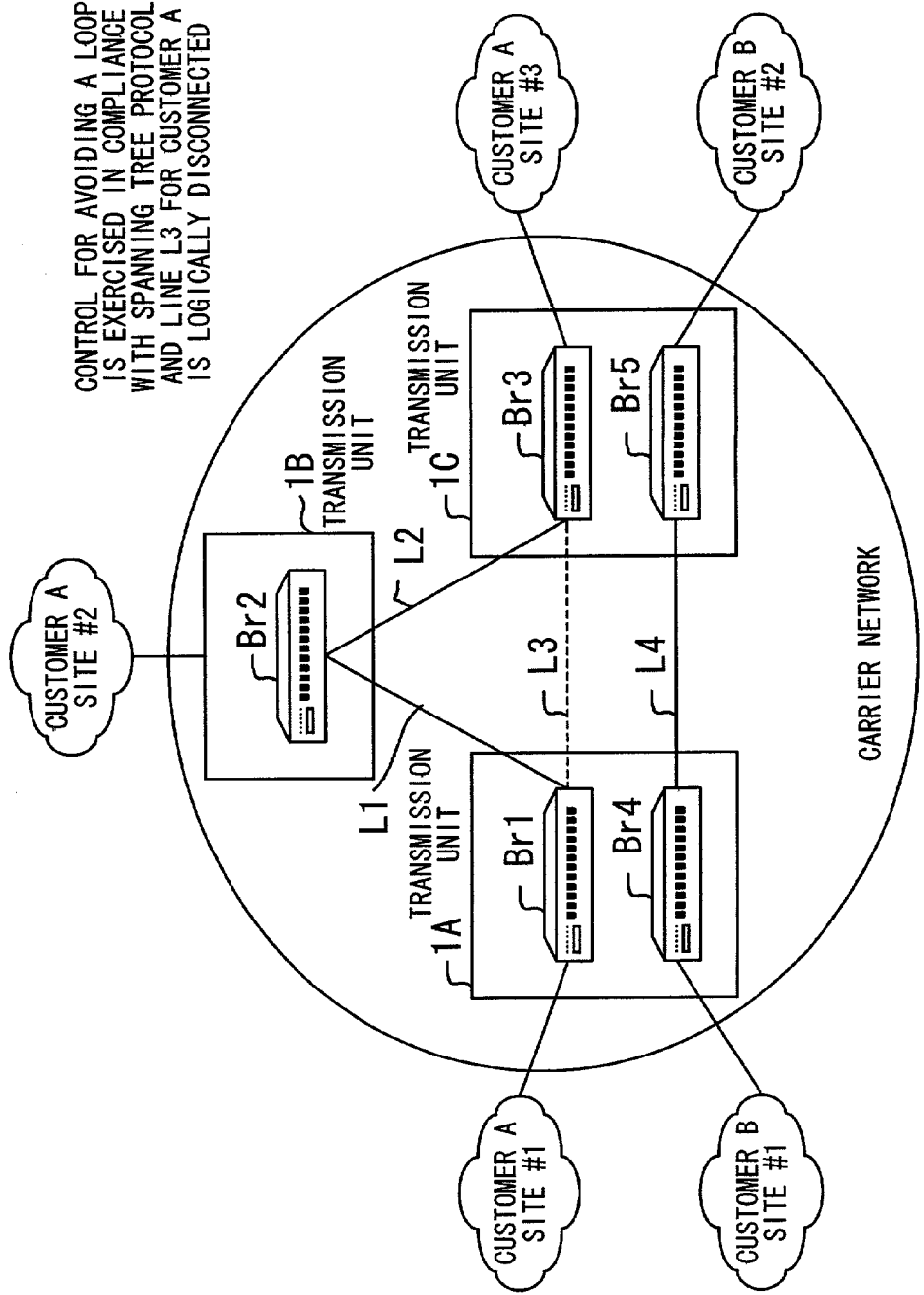
FIG. 2 is a view for describing problems.
Figure 3:
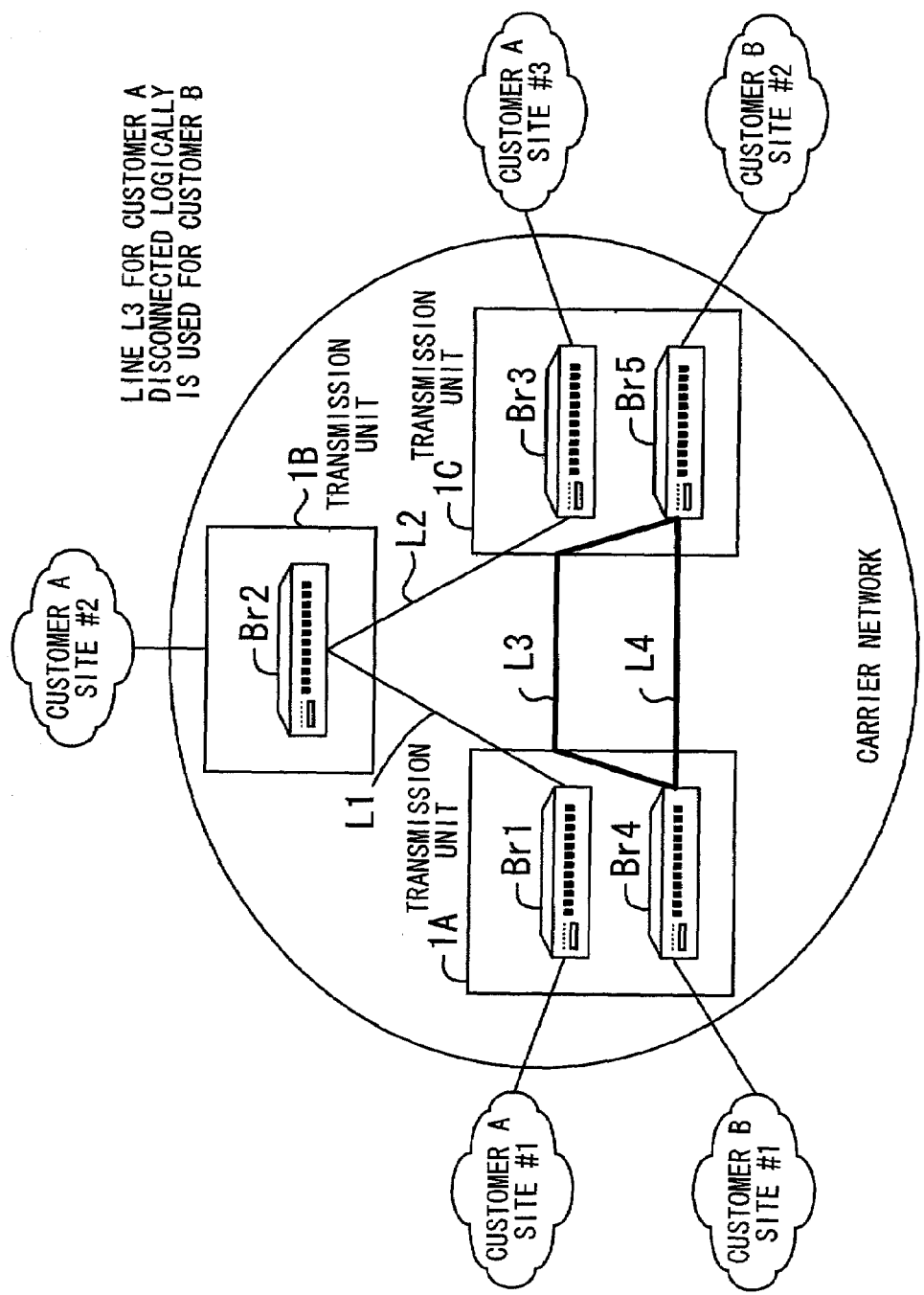
FIG. 3 is a view for giving an overview of operation in the present invention.

Now, conventional problems and an overview of operation in the present invention will be described. FIG. 2 is a view for describing problems. FIG. 3 is a view for giving an overview of operation in the present invention. A transmission unit 1A with bridges Br1 and Br4, transmission unit 1B with a bridge Br2, and transmission unit 1C with bridges Br3 and Br5 are located on a carrier network.

The bridge Br1 connects with customer A's site #1; the bridge Br4 connects with customer B's site #1; the bridge Br2 connects with customer A's site #2; the bridge Br3 connects with customer A's site #3; and the bridge Br5 connects with customer B's site #2.

The bridges Br1 and Br2 are connected via line L1 to communicate with each other. The bridges Br2 and Br3 are connected via line L2 to communicate with each other. (These bridges communicate for customer A.) The bridges Br4 and Br5 are connected via line L4 to communicate with each other (to communicate for customer B).

As shown in FIG. 2, line L3 which connects the bridges Br1 and Br3 will be logically disconnected (line L3 is not used to communicate for customer A) because one of a bridge port on the bridge Br1 and a bridge port on the bridge Br3 which connect directly with line L3 is blocked in compliance with the spanning tree protocol. Conventionally, no consideration was given to the use of such a disconnected line.

However, lines forming a carrier network provided by a communication service provider are expensive. If a line on a carrier network disconnected logically in compliance with the spanning tree protocol cannot be used for data transmission, this is a great waste.

As shown in FIG. 3, in the present invention, line L3 for customer A disconnected logically in compliance with the spanning tree protocol can be used for customer B. That is to say, the bridges Br4 and Br5 can communicate with each other by the use of two lines L3 and L4.

As a result, even if there is a line to a port blocked in compliance with the spanning tree protocol on a carrier network formed by expensive lines, that line can be used for providing other communication services. This enables effective use of lines forming a network and improvement in communication quality.

Now, port state information and a port correspondence table T will be described. Port state information consists of frames used solely for exchanging information with an opposite unit. These frames include a state notification frame, switching request frame, and response frame.

In the present invention, a new BPDU type other than BPDU types (configuration BPDU and topology change notification BPDU) defined in IEEE802.1D will be defined and the above three frames will be used. Hereinafter a state notification frame, switching request frame, and response frame will be referred to as a state notification BPDU, switching request BPDU, and switching ACK BPDU respectively.

Figure 4:
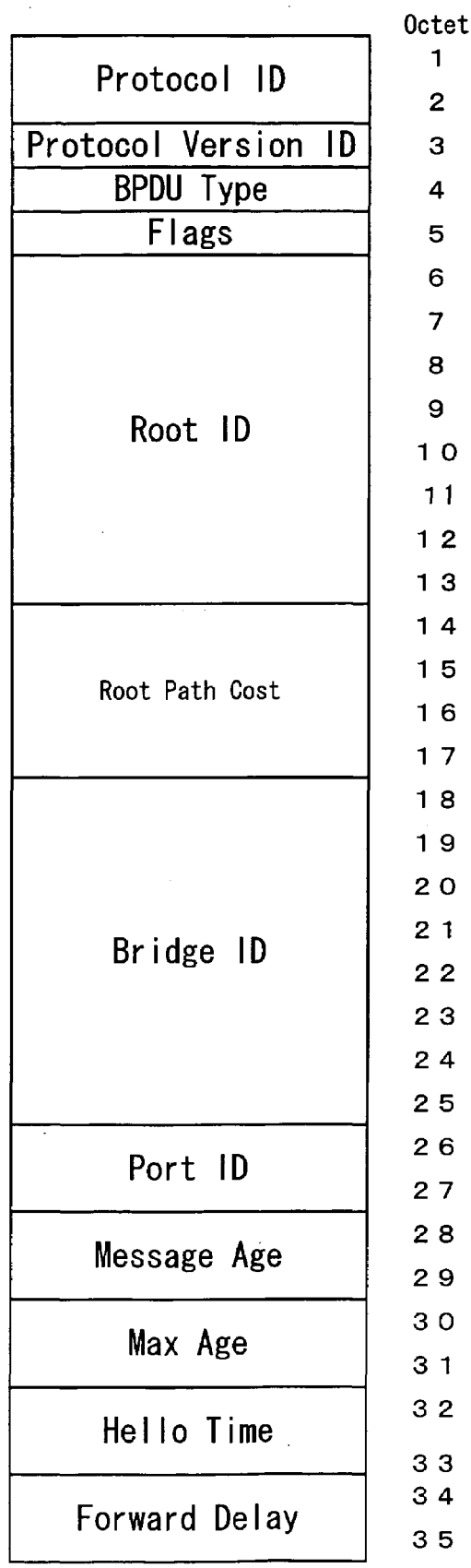
FIG. 4 is a view showing the format of a configuration BPDU defined in IEEE802.1D.

FIG. 4 is a view showing the format of a configuration BPDU defined in IEEE802.1D. The type of a BPDU will be identified by the value of BPDU Type. IEEE802.1D defines the two types: configuration BPDU and topology change notification BPDU. In the present invention, however, a new value is set in BPDU Type to define a state notification BPDU, switching request BPDU, and switching ACK BPDU.

Figure 5:
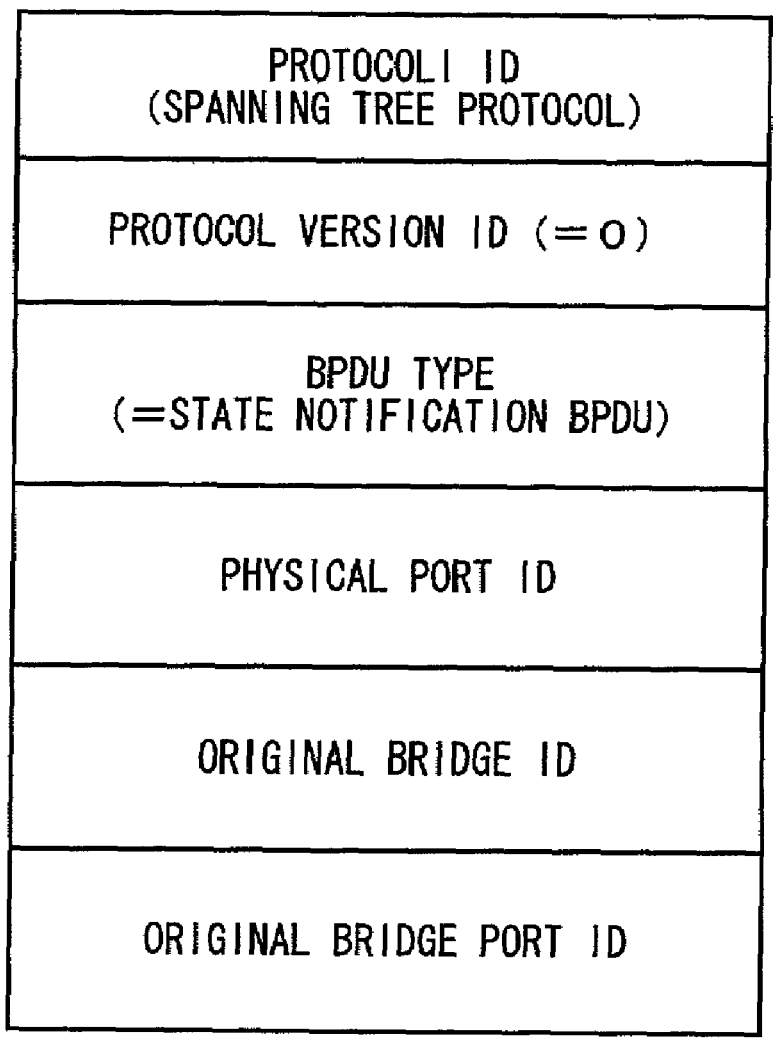
FIG. 5 is a view showing the format of a state notification BPDU.

FIG. 5 is a view showing the format of a state notification BPDU. Protocol ID is a protocol identifier and a value indicative of the spanning tree protocol is set. The value of Protocol Version ID is zero (constant). A value indicative of a state notification BPDU is set in BPDU Type.

The ID of a physical port on the transmission unit 1 is set in Physical Port ID. The ID of a bridge before switching which corresponds to the physical port is set in Original Bridge ID. The ID of a bridge port before switching is set in Original Bridge Port ID.

Figure 6:
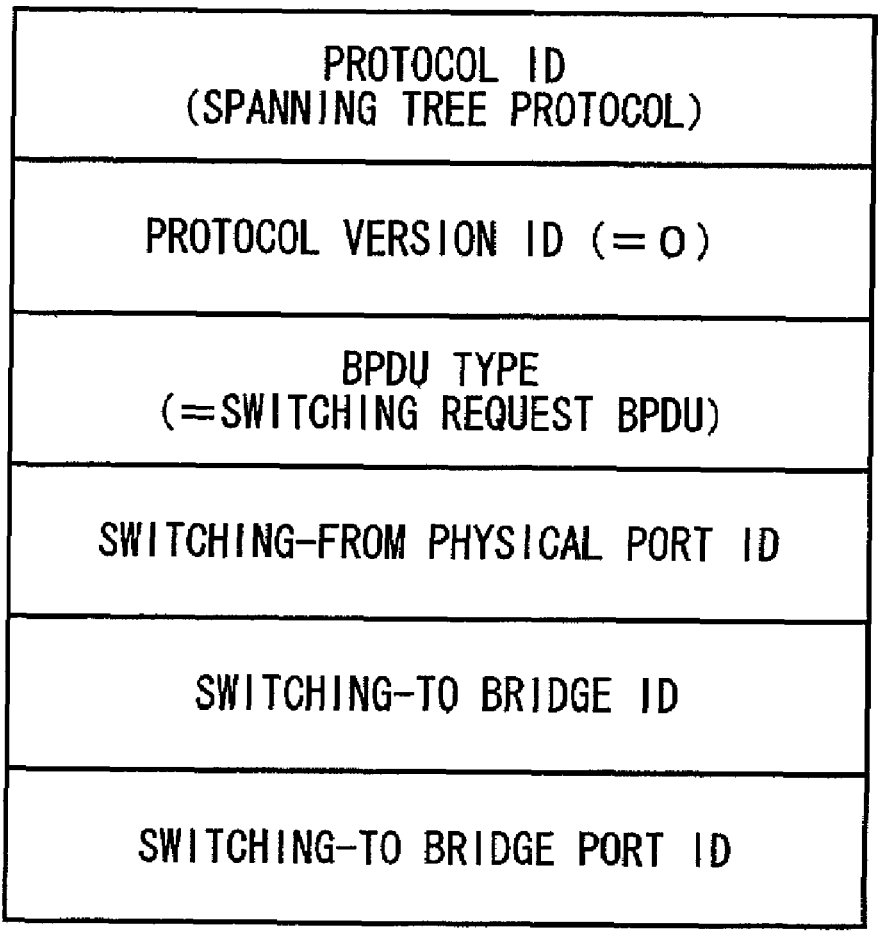
FIG. 6 is a view showing the format of a switching request BPDU.

FIG. 6 is a view showing the format of a switching request BPDU. A value indicative of the spanning tree protocol is set in Protocol ID. The value of Protocol Version ID is zero (constant). A value indicative of a switching request BPDU is set in BPDU Type.

The ID of a physical port from which port switching is performed is set in Switching-from Physical Port ID. The ID of a bridge to which switching is performed is set in Switching-to Bridge ID. The ID of a bridge port to which switching is performed is set in Switching-to Bridge Port ID.

Figure 7:
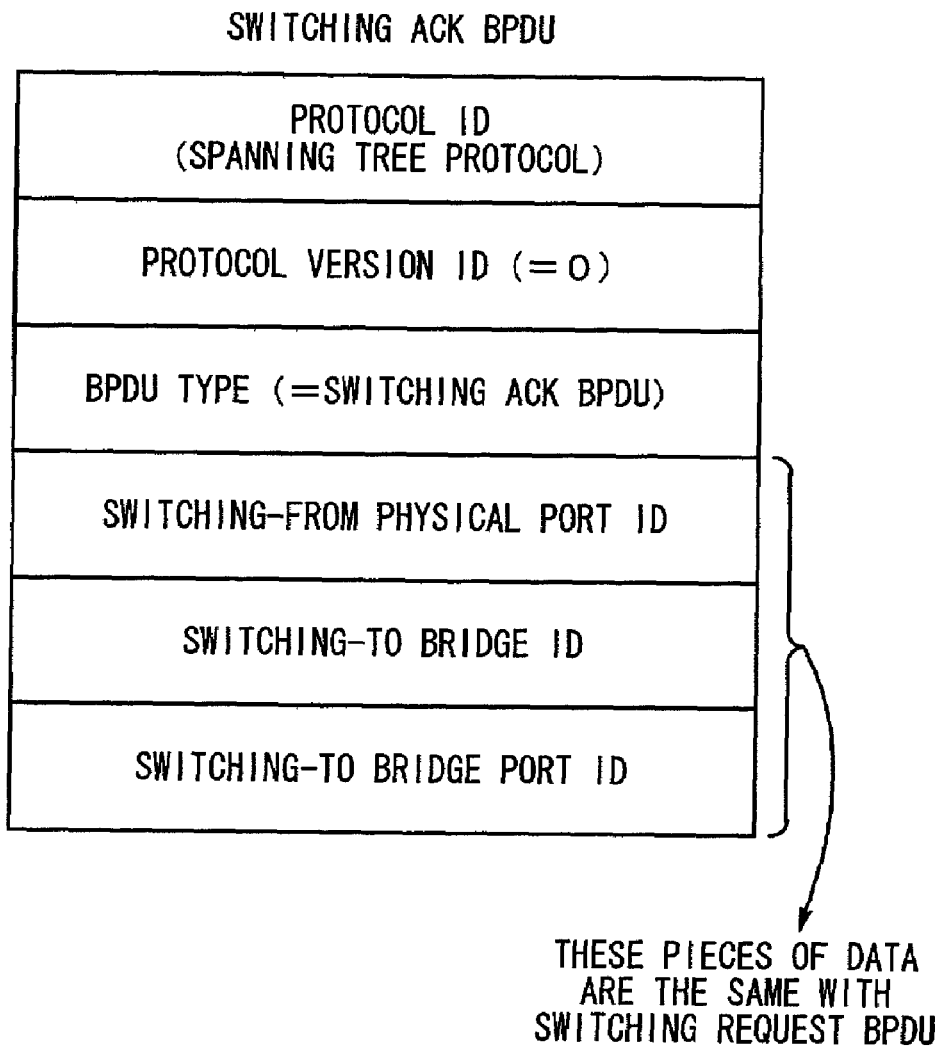
FIG. 7 is a view showing the format of a switching ACK BPDU.

FIG. 7 is a view showing the format of a switching ACK BPDU. A value indicative of the spanning tree protocol is set in Protocol ID. The value of Protocol Version ID is zero (constant). A value indicative of a switching ACK BPDU is set in BPDU Type.

The values of Switching-from Physical Port ID, Switching-to Bridge ID, and Switching-to Bridge Port ID in a switching ACK BPDU are the same as those of Switching-from Physical Port ID, Switching-to Bridge ID, and Switching-to Bridge Port ID, respectively, in a switching request BPDU (that is to say, a switching request BPDU is simply sent back with the value of BPDU Type changed to a value indicative of a switching ACK BPDU).

FIG. 8 is a view showing the structure of a port correspondence table T. The port correspondence table T includes information regarding the correspondence between ports on a unit and information regarding the correspondence between ports on an opposite unit.

Information regarding Unit consists of Physical Port ID, New Bridge ID, New Bridge Port ID, Bridge Port State, Original Bridge ID, and Original Bridge Port ID fields. Information regarding Opposite Unit consists of Physical Port ID, Bridge ID, and Bridge Port ID fields. The New Bridge ID and New Bridge Port ID fields indicate information after switching and the Original Bridge ID and Original Bridge Port ID fields indicate information before switching.

Now, the entire operation of the transmission unit 1 will be described in detail by setting concrete values in a state notification BPDU, switching request BPDU, switching ACK BPDU, and port correspondence table T. FIGS. 9 through 16 are views showing the sequence of the operation of transmission units and port correspondence tables corresponding to states 1 through 4.

Figure 9:
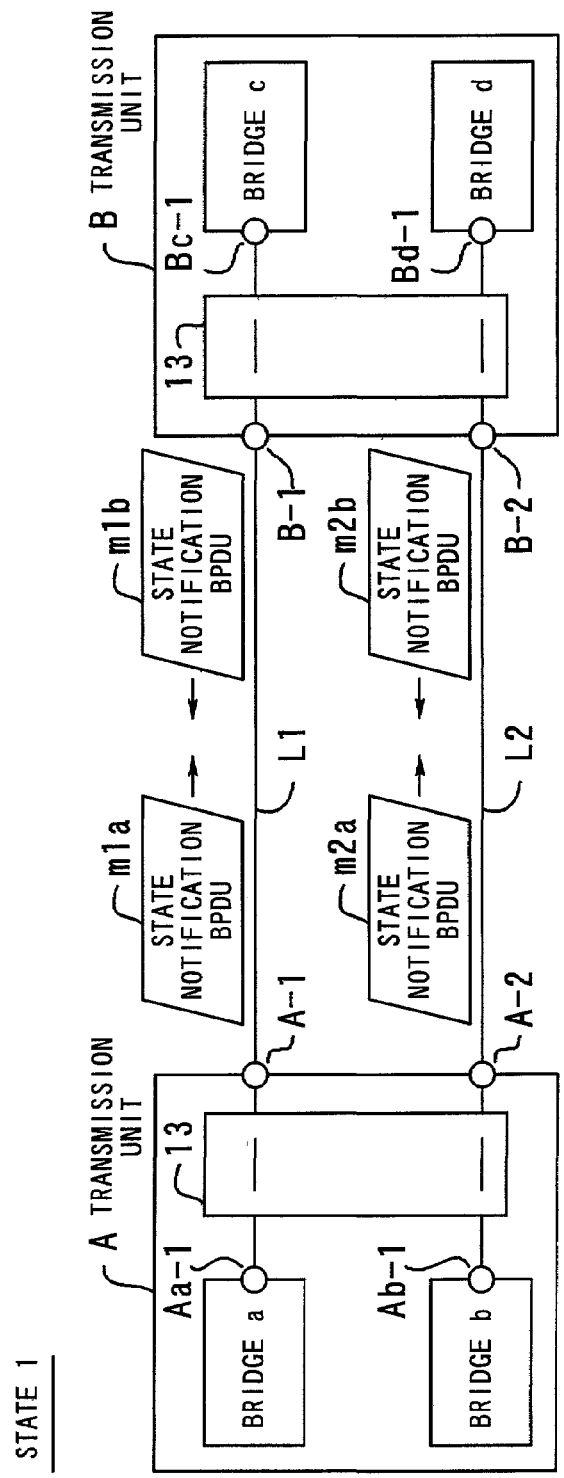
FIG. 9 is a view showing the state of transmission units in the case of state 1.

FIG. 9 is a view showing the state of transmission units in the case of the state 1. FIGS. 10(A) and 10(B) are views showing a port correspondence table corresponding the state 1. FIG. 10(A) shows a port correspondence table T1A for a transmission unit A. FIG. 10(B) shows a port correspondence table T1B for a transmission unit B.

The transmission unit A includes a bridge a with a bridge port Aa-1 and a bridge b with a bridge port Ab-1. In the state 1, the bridge ports Aa-1 and Ab-1 connect with physical ports A-1 and A-2, respectively, via the switching section 13.

The transmission unit B includes a bridge c with a bridge port Bc-1 and a bridge d with a bridge port Bd-1. In the state 1, the bridge ports Bc-1 and Bd-1 connect with physical ports B-1 and B-2, respectively, via the switching section 13.

Moreover, the physical ports A-1 and B-1 connect via a line L1 and the physical ports A-2 and B-2 connect via a line L2.

In the transmission unit A, Information regarding Unit A in the port correspondence table T1A is generated on the basis of information regarding the ports on it. The same applies to the transmission unit B. In line #1 in Information regarding Unit A in the port correspondence table T1A, Physical Port ID is A-1, New Bridge ID is a, New Bridge Port ID is Aa-1, Bridge Port State is non-blocked state (No-blk), Original Bridge ID is a, and Original Bridge Port ID is Aa-1.

In line #2 in Information regarding Unit A, Physical Port ID is A-2, New Bridge ID is b, New Bridge Port ID is Ab-1, Bridge Port State is No-blk, Original Bridge ID is b, and Original Bridge Port ID is Ab-1.

In line #1 in Information regarding Unit B in the port correspondence table T1B, Physical Port ID is B-1, New Bridge ID is c, New Bridge Port ID is Bc-1, Bridge Port State is No-blk, Original Bridge ID is c, and Original Bridge Port ID is Bc-1.

In line #2 in Information regarding Unit B, Physical Port ID is B-2, New Bridge ID is d, New Bridge Port ID is Bd-1, Bridge Port State is No-blk, Original Bridge ID is d, and Original Bridge Port ID is Bd-1.

The port state management control sections 14 in the transmission units A and B exchange state notification BPDUs with each other. By doing so, information regarding the ports on the opposite unit will be exchanged. The port state management control section 14 in the transmission unit A sends a state notification BPDU m1a including information regarding the unit A from the physical port A1. Moreover, the port state management control section 14 in the transmission unit A receives a state notification BPDU m1b via the physical port A-1 and updates information regarding the unit B in the port correspondence table T1A.

Similarly, the port state management control section 14 in the transmission unit A sends a state notification BPDU m2a including information regarding the transmission unit A from the physical port A-2. Moreover, the port state management control section 14 in the transmission unit A receives a state notification BPDU m2b via the physical port A-2 and updates information regarding the transmission unit B in the port correspondence table T1A.

The port state management control section 14 in the transmission unit B sends a state notification BPDU m1b including information regarding the unit B from the physical port B-1. Moreover, the port state management control section 14 in the transmission unit B receives the state notification BPDU m1a via the physical port B-1 and updates information regarding the transmission unit A in the port correspondence table T1B.

Similarly, the port state management control section 14 in the transmission unit B sends a state notification BPDU m2b including information regarding the unit B from the physical port B-2. Moreover, the port state management control section 14 in the transmission unit B receives the state notification BPDU m2a via the physical port B-2 and updates information regarding the transmission unit A in the port correspondence table T1B.

In this case, the values of Physical Port ID, Original Bridge ID, and Original Bridge Port ID in the state notification BPDU m1a are set to A-1, a, and Aa-1 respectively. The values of Physical Port ID, Original Bridge ID, and Original Bridge Port ID in the state notification BPDU m2a are set to A-2, b, and Ab-1 respectively.

The values of Physical Port ID, Original Bridge ID, and Original Bridge Port ID in the state notification BPDU m1b are set to B-1, c, and Bc-1 respectively. The values of Physical Port ID, Original Bridge ID, and Original Bridge Port ID in the state notification BPDU m2b are set to B-2, d, and Bd-1 respectively.

By exchanging such state notification BPDUs, Information regarding Unit B in the port correspondence table T1A and Information regarding Unit A in the port correspondence table T1B will be generated. In line #1 in Information regarding Unit B in the port correspondence table T1A, Physical Port ID is B-1, Bridge ID is c, and Bridge Port ID is Bc-1. In line #2 in Information regarding Unit B in the port correspondence table T1A, Physical Port ID is B-2, Bridge ID is d, and Bridge Port ID is Bd-1.

In line #1 in Information regarding Unit A in the port correspondence table T1B, Physical Port ID is A-1, Bridge ID is a, and Bridge Port ID is Aa-1. In line #2 in Information regarding Unit A in the port correspondence table T1B, Physical Port ID is A-2, Bridge ID is b, and Bridge Port ID is Ab-1.

Figure 11:
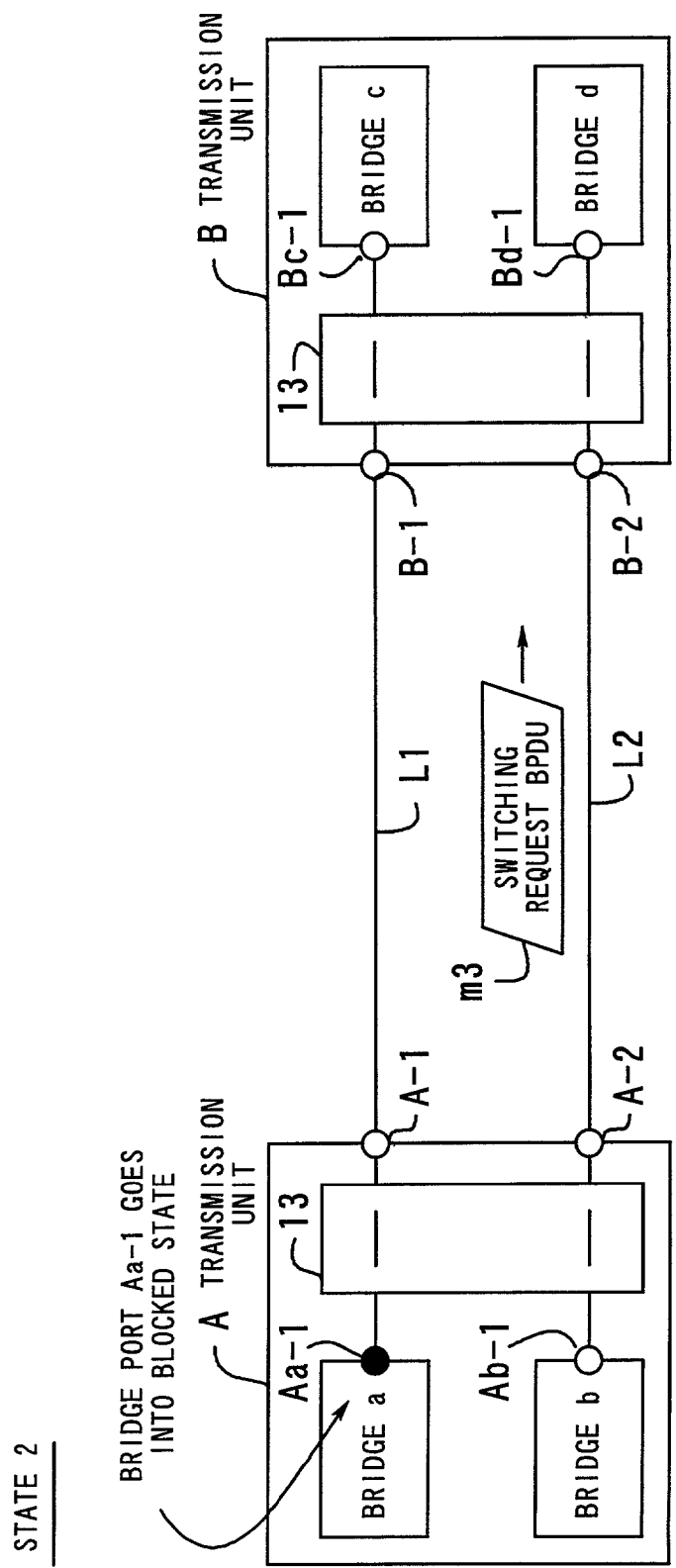
FIG. 11 is a view showing the state of the transmission units in the case of state 2.

FIG. 11 is a view showing the state of the transmission units in the case of the state 2. FIGS. 12(A) and 12(B) are views showing a port correspondence table corresponding to the state 2. FIG. 12(A) shows a port correspondence table T2A for the transmission unit A. FIG. 12(B) shows a port correspondence table T2B for the transmission unit B. In this case, the transmission unit B has received a switching request BPDU, but it has not updated the contents of the port correspondence table T2B yet (the contents of the port correspondence table T2B therefore are the same as those of the port correspondence table T1B).

In the state 2, the bridge port Aa-1 on the transmission unit A goes into a blocked state, the transmission unit A updates the contents of the port correspondence table T1A, and the transmission unit B receives a switching request BPDU sent from the transmission unit A.

When the bridge port state monitoring section 11 in the transmission unit A detects that the bridge port Aa-1 went into a blocked state, it updates information regarding the transmission unit A in the port correspondence table T1A and sends state change notification to the port state management control section 14. When the port state management control section 14 receives the state change notification, it sends a switching request BPDU m3 from the physical port A-2 to the transmission unit B.

In line #1 in Information regarding Unit A in the port correspondence table T2A corresponding to the state 2, the value of Bridge Port State has changed to blocked state (blk). Except for this field, the contents of the port correspondence table T2A (including Information regarding Unit B) are the same as those of the port correspondence table T1A corresponding to the state 1.

In this case, the values of Switching-from Physical Port ID, Switching-to Bridge ID, and Switching-to Bridge Port ID in the switching request BPDU m3 are set to A-1, b, and Ab-1 respectively.

Figure 13:
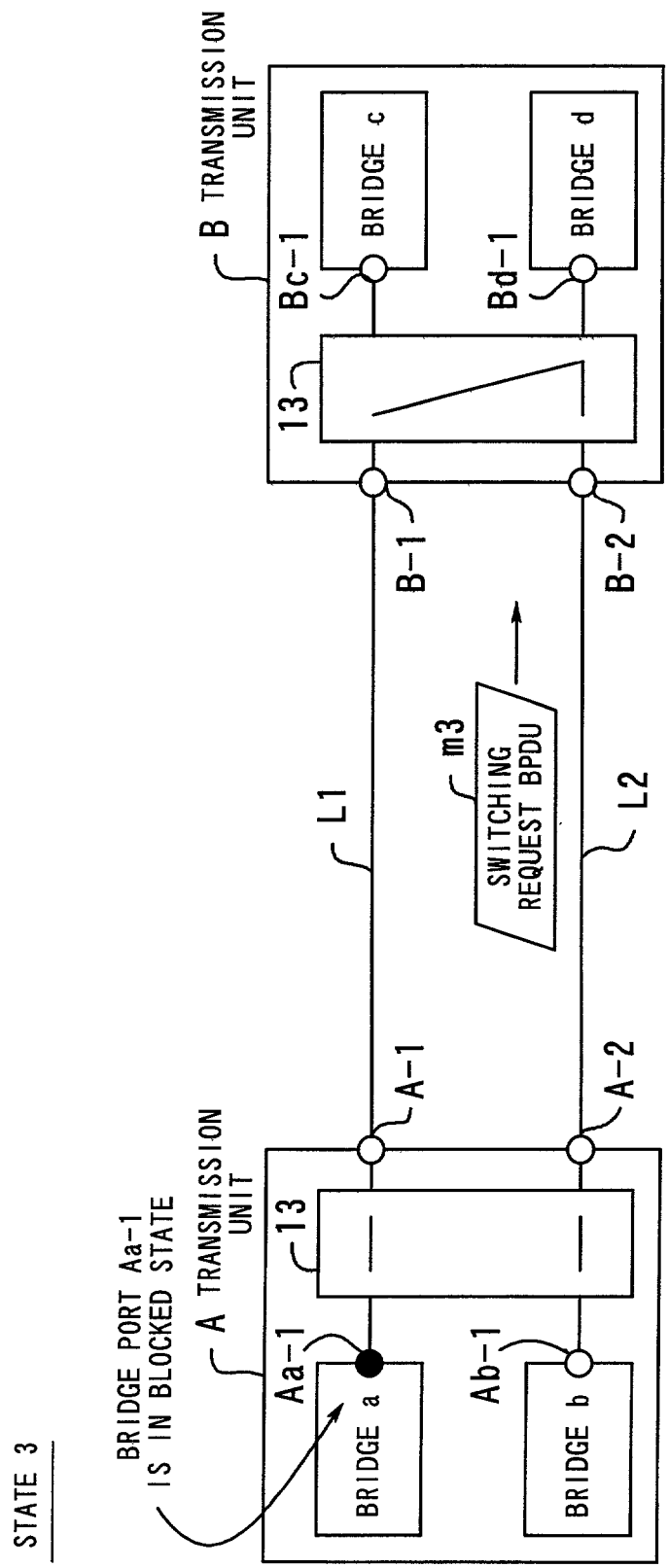
FIG. 13 is a view showing the state of the transmission units in the case of state 3.

FIG. 13 is a view showing the state of the transmission units in the case of the state 3. FIGS. 14(A) and 14(B) are views showing a port correspondence table corresponding to the state 3. FIG. 14(A) shows a port correspondence table T3A for the transmission unit A. FIG. 14(B) shows a port correspondence table T3B for the transmission unit B. In this case, the transmission unit A has not received a switching ACK BPDU yet and therefore has not updated the contents of the port correspondence table T2A yet (the contents of the port correspondence table T3A therefore are the same as those of the port correspondence table T2A).

In the state 3, the transmission unit B which received the switching request BPDU updates the contents of the port correspondence table T2B and performs switching.

When the port state management control section 14 in the transmission unit B receives the switching request BPDU m3 via the physical port B-2, it detects the physical port B-1 on the transmission unit B connected to the physical port A-1 on the transmission unit A and updates the port correspondence table T2B.

In line #1 in Information regarding Unit B in the port correspondence table T3B corresponding to the state 3, the values of New Bridge ID and New Bridge Port ID have changed to d and Bd-1 respectively. Except for these fields, the contents of the port correspondence table T3B (including Information regarding Unit A) are the same as those of the port correspondence table T2B corresponding to the state 2.

The switching section 13 in the transmission unit B connects the physical port B-1 with the bridge port Bd-1 on the basis of the port correspondence table T3B.

Figure 15:
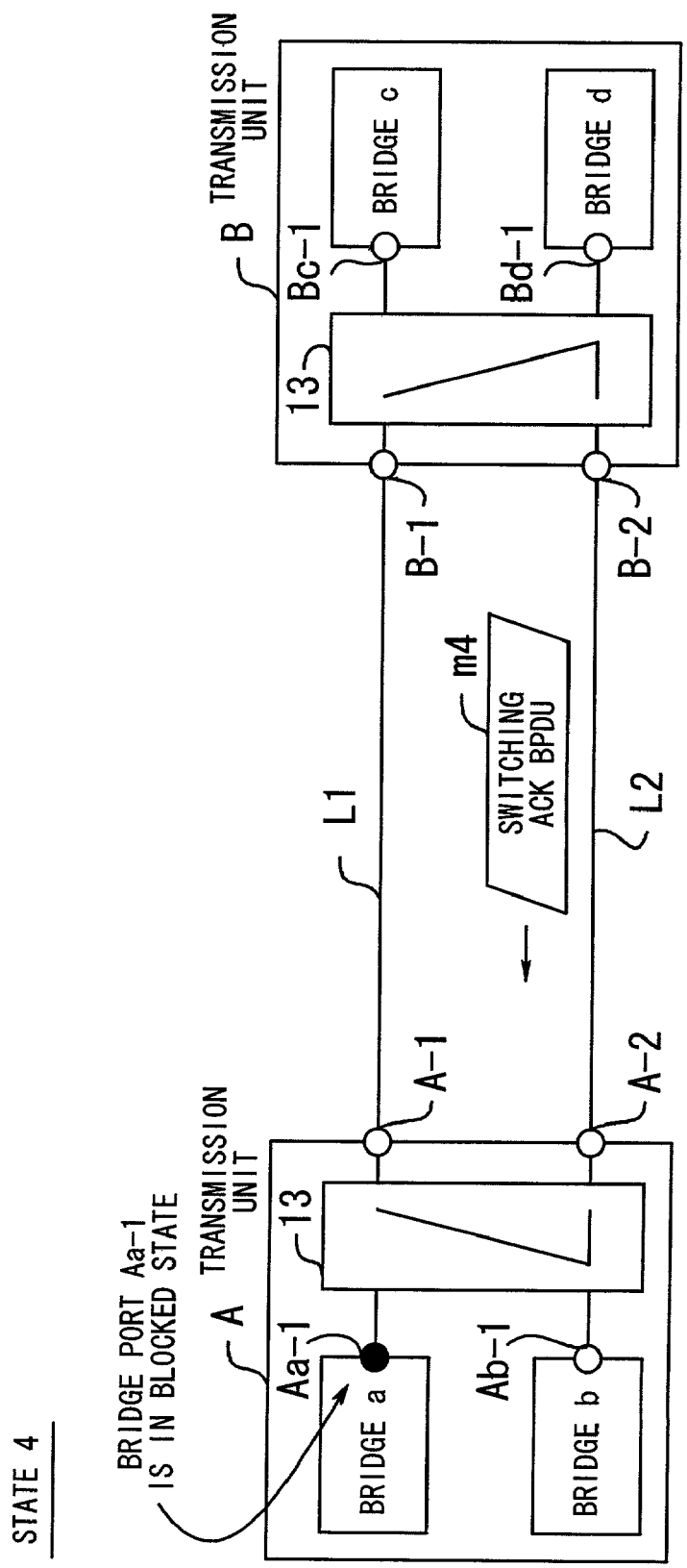
FIG. 15 is a view showing the state of the transmission units in the case of state 4.

FIG. 15 is a view showing the state of the transmission units in the case of the state 4. FIGS. 16(A) and 16(B) are views showing a port correspondence table corresponding to the state 4. FIG. 16(A) shows a port correspondence table T4A for the transmission unit A. FIG. 16(B) shows a port correspondence table T4B for the transmission unit B. In this case, the contents of the port correspondence table T4B are the same as those of the port correspondence table T3B corresponding to the state 3.

In the state 4, the transmission unit B which performed switching sends a switching ACK BPDU m4 (the contents of which is the same as those of the switching request BPDU m3) from the physical port B-2 and the transmission unit A receives it, updates the port correspondence table T3A, and performs switching. Both the transmission units A and B complete port switching.

When the port state management control section 14 in the transmission unit A receives the switching ACK BPDU m4 via the physical port A-2, it updates the port correspondence table T4A.

In line #1 in Information regarding Unit A in the port correspondence table T4A corresponding to the state 4, the values of New Bridge ID and New Bridge Port ID have changed to b and Ab-1 respectively. Except for these fields, the contents of the port correspondence table T4A (including Information regarding Unit B) are the same as those of the port correspondence table T3A corresponding to the state 3. The switching section 13 in the transmission unit A connects the physical port A-1 with the bridge port Ab-1 on the basis of the port correspondence table T4A.

Now, the priority setting section 15 will be described. The priority setting section 15 enables a user to set the priority and upper limits of assigned bands for bridge ports. These priority and upper limits of assigned bands will be used when the correspondence between bridge ports and physical ports is changed. As a result, a physical port can be assigned to a specific port as a user intends.

FIG. 17 is a view showing a priority/upper assigned band limit setting table. A priority/upper assigned band limit setting table t is managed by the priority setting section 15. The priority/upper assigned band limit setting table t includes Bridge ID, Bridge Port ID, Priority, and Upper Assigned Band Limit fields.

Figure 18:
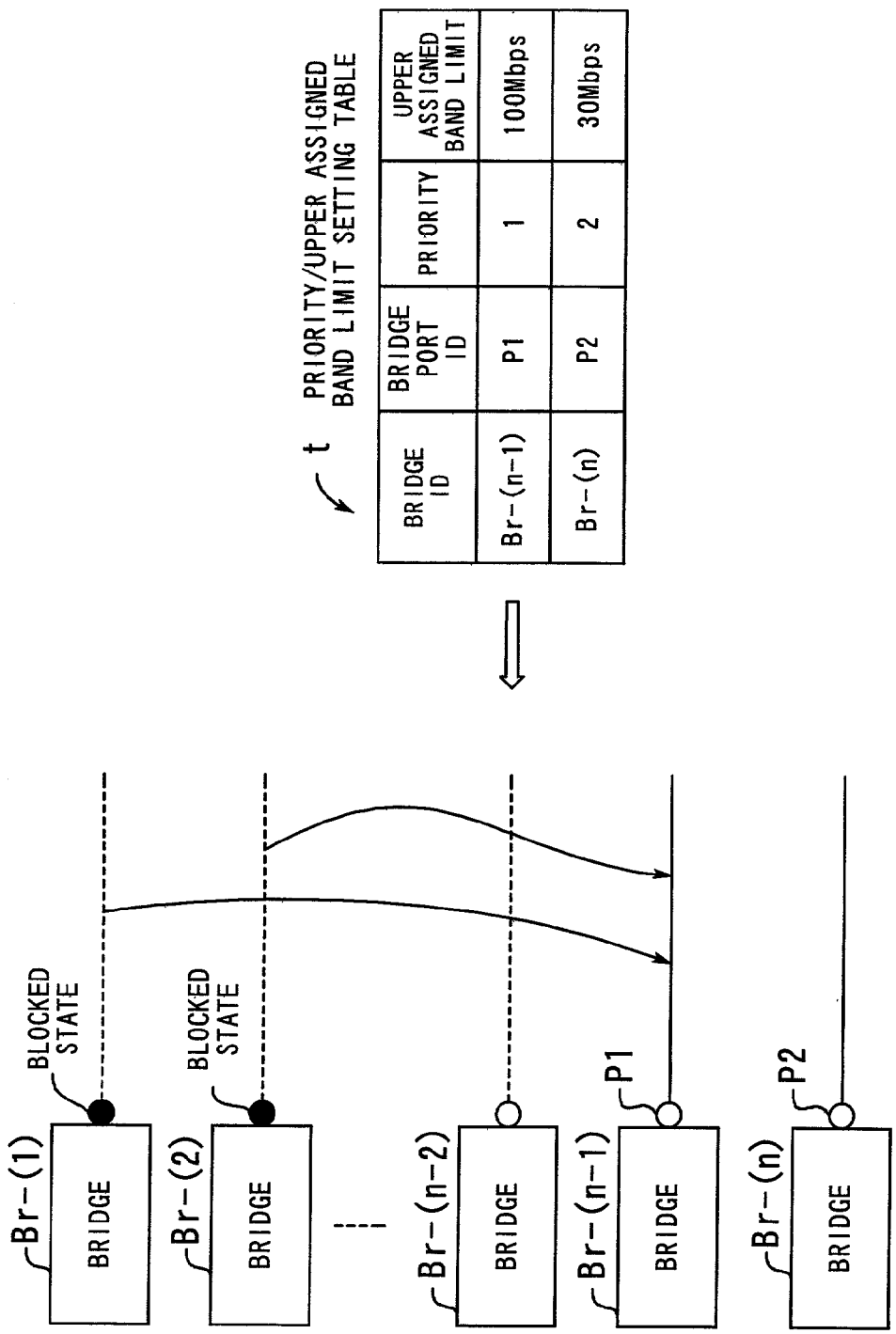
FIG. 18 is a view showing operation performed when priority and the upper limits of assigned bands are set.

FIG. 18 is a view showing operation performed when priority and the upper limits of assigned bands are set. It is assumed that the transmission unit 1 includes bridges Br-(1) through Br-(n) and that a bridge port on the bridge Br-(n-1) and a bridge port on the bridge Br-(n) are P1 and P2 respectively.

Furthermore, in the priority/upper assigned band limit setting table t, it is assumed that the highest priority is given to the bridge port P1 on the bridge Br-(n-1), that the upper limit of an assigned band for the bridge port P1 is set to 100 Mbps, that the next highest priority is given to the bridge port P2 on the bridge Br-(n), and that the upper limit of an assigned band for the bridge port P2 is set to 30 Mbps.

When a bridge port on one of the bridges Br-(1) through Br-(n) (excluding the bridge Br-(n-1)) goes into a blocked state, the bridge port P1 on the bridge Br-(n-1) connects with the physical port connected to the bridge port which went into a blocked state on the basis of the contents of the priority/upper assigned band limit setting table t to use a line disconnected logically. The maximum usable data transmission rate at the bridge port P1 on the bridge Br-(n-1) is 100 Mbps.

It is assumed that still another bridge port on one of the bridges Br-(1) through Br-(n) (excluding the bridge Br-(n)) goes into a blocked state. If the bridge port P1 on the bridge Br-(n-1) uses this line, the data transmission rate may exceed 100 Mbps. If the data transmission rate exceeds 100 Mbps, then the bridge port P2 on the bridge Br-(n) to which the next highest priority is given will use this line. The maximum usable data transmission rate at the bridge port P2 on the bridge Br-(n) is 30 Mbps.

Now, a process performed on each of the components of the transmission unit 1 at the time of the transmission unit 1 being started will be described. When the transmission unit 1 is started, values are written in the Physical Port ID, New Bridge ID, New Bridge Port ID, Original Bridge ID, and Original Bridge Port ID fields in Information regarding Unit in a port correspondence table T in ascending order of ID of physical port, bridge, and bridge port on bridge included in the transmission unit 1 to initialize them. The Bridge Port State field is initialized to non-blocked state. The Physical Port ID, Bridge ID, and Bridge Port ID fields in Information regarding Opposite Unit are initialized to invalid values.

Values are written in the Bridge ID and Bridge Port ID fields in a priority/upper assigned band limit setting table t in ascending order of ID of bridge and bridge port included in the transmission unit 1 to initialize them.

The Priority field is initialized to the lowest priority. That is to say, if a number between one (highest priority) and five (lowest priority) can be set, the Priority field is initialized to five. The Upper Assigned Band Limit field is initialized without limitation. The priority setting section 15 waits for a user to input a command from the time directly after the transmission unit 1 being started.

The switching section 13 performs switching on frames it sends or receives on the basis of a port correspondence table T from the time directly after the transmission unit 1 being started. Instead of monitoring the state of bridge ports directly after the transmission unit 1 being started, the bridge port state monitoring section 11 waits for twice the longest bridge forward delay of bridge forward delays which occur in all the bridges included in the transmission unit 1 (the state of the port changes from listening to forwarding through learning at the time of a bridge being started and time the port needs to change from a state to another state is called bridge forward delay) until a spanning tree is built by all the bridges and the state of the bridge ports stabilizes. Then the bridge port state monitoring section 11 begins to monitor the state of a bridge port on each bridge.

Directly after the transmission unit 1 being started, the port state management control section 14 generates a state notification BPDU corresponding to each physical port and sends it from the appropriate physical port, on the basis of a port correspondence table T.

Figure 19:
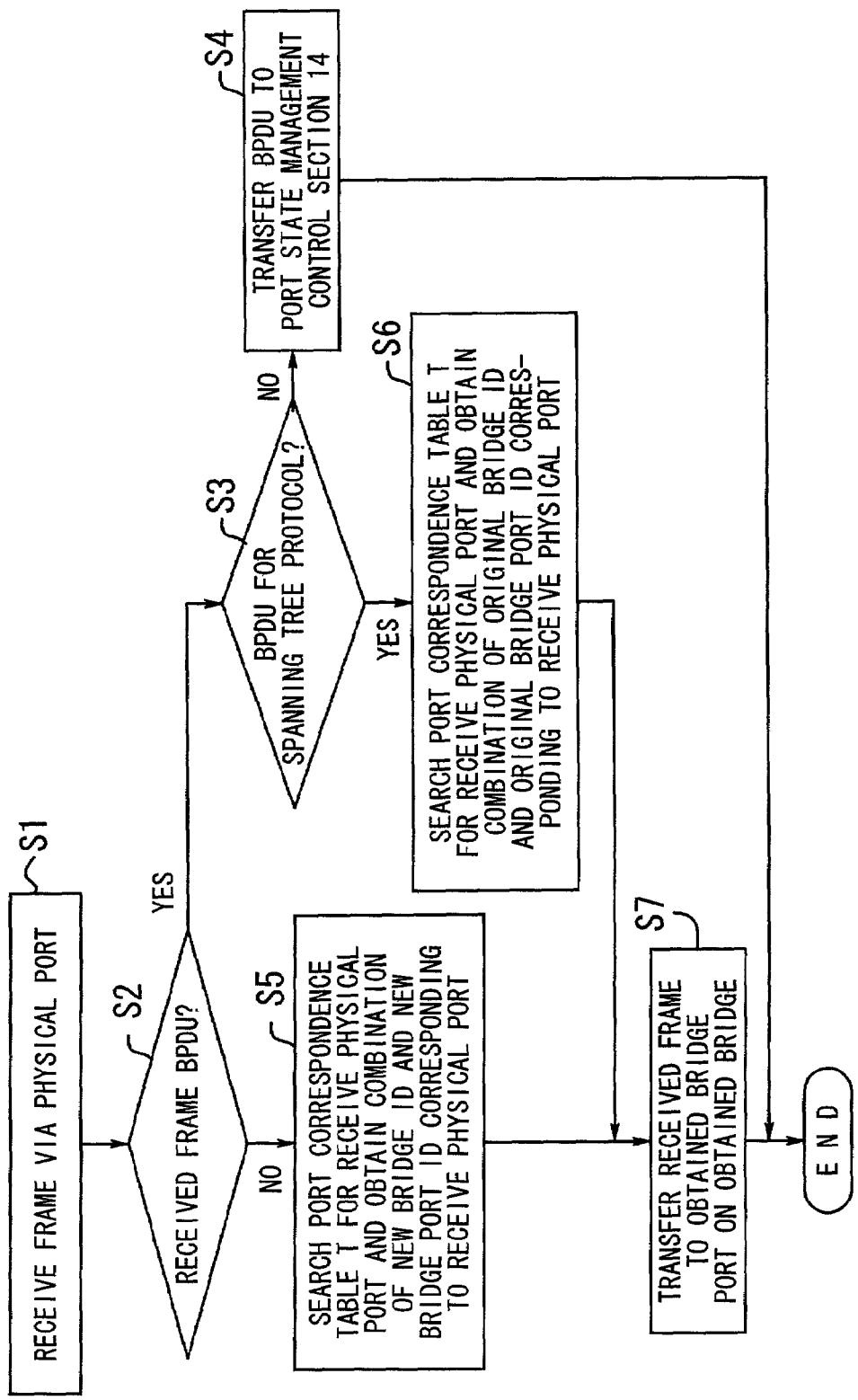
FIG. 19 is a view showing the flow of processes performed when a switching section receives a frame via a physical port.

Now, processes performed when the switching section 13 receives a frame via a physical port will be described. FIG. 19 is a view showing the flow of processes performed when the switching section 13 receives a frame via a physical port.

[S1] The switching section 13 receives a frame via a physical port.

[S2] The switching section 13 judges whether the frame received is a BPDU. If it is not a BPDU (that is to say, if it is an information frame for transferring data), then step S5 will be performed. If it is a BPDU, then step S3 will be performed.

[S3] The switching section 13 judges whether the frame received is a BPDU for the spanning tree protocol. If it is a BPDU for the spanning tree protocol (configuration BPDU or topology change notification BPDU), then step S6 will be performed. If it is not a BPDU for the spanning tree protocol (that is to say, if it is a state notification BPDU, switching request BPDU, or switching ACK BPDU according to the present invention), then step S4 will be performed.

[S4] The switching section 13 transfers the BPDU received to the port state management control section 14. Subsequent processes will be described later in FIGS. 23 through 26.

[S5] The switching section 13 searches the Physical Port ID field in Information regarding Unit in a port correspondence table T for a receive physical port. Then the switching section 13 obtains a combination of new bridge ID and new bridge port ID corresponding to the receive physical port (a combination of new bridge ID and new bridge port ID after switching is obtained in order to pass the information frame to a bridge to which switching has already been performed). And then step S7 will be performed.

[S6] The switching section 13 searches the Physical Port ID field in Information regarding Unit in a port correspondence table T for a receive physical port and obtains a combination of original bridge ID and original bridge port ID corresponding to the receive physical port.

The contents of the BPDU for the spanning tree protocol can be to the effect that the port must change from a blocked state to another state. In such a case, this information needs to be passed to a bridge from which switching has not been performed yet. Therefore, a combination of original bridge ID and original bridge port ID before switching is obtained.

[S7] The switching section 13 transfers the frame received to the bridge port on the bridge it obtained.

Figure 20:
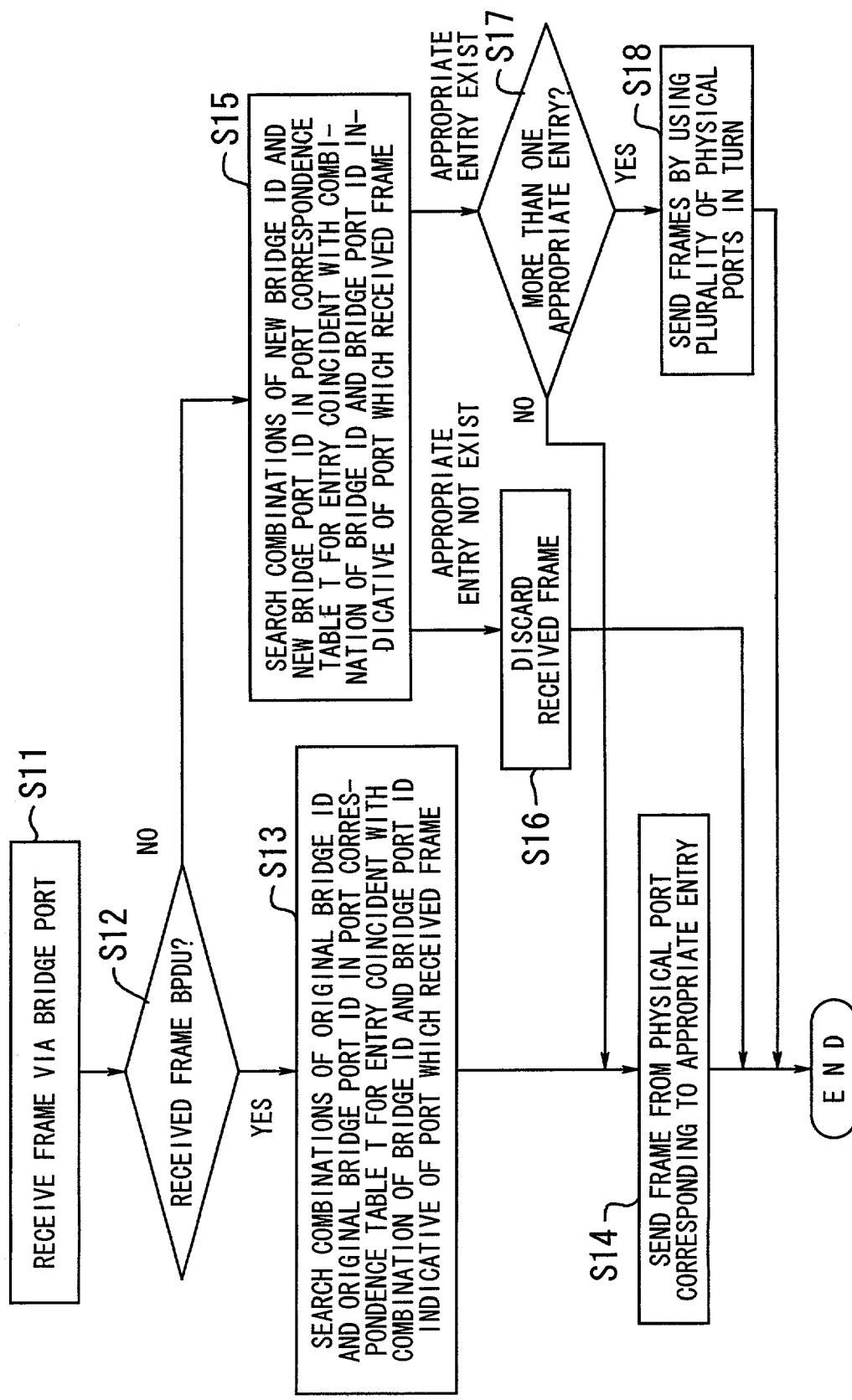
FIG. 20 is a view showing the flow of processes performed when the switching section receives a frame via a bridge port.

Now, processes performed when the switching section 13 receives a frame via a bridge port will be described with reference to FIGS. 20 through 22. FIG. 20 is a view showing the flow of processes performed when the switching section 13 receives a frame via a bridge port.

[S11] The switching section 13 receives a frame via a bridge port.

[S12] The switching section 13 judges whether the frame is a BPDU. If it is a BPDU (a bridge outputs a configuration BPDU or topology change notification BPDU), then step S13 will be performed. If it is not a BPDU (that is to say, if it is an information frame), then step S15 will be performed.

[S13] The switching section 13 searches combinations of original bridge ID and original bridge port ID in a port correspondence table T for an entry coincident with a port on the switching section 13 (indicated by a combination of bridge ID and bridge port ID) which received the frame.

[S14] The switching section 13 sends the frame from the physical port corresponding to the appropriate entry.

[S15] The switching section 13 searches combinations of new bridge ID and new bridge port ID in the port correspondence table T for all the entries coincident with the port on the switching section 13 (indicated by a combination of bridge ID and bridge port ID) which received the frame. If there is no appropriate entry, then step S16 will be performed. If there is an appropriate entry, then step S17 will be performed.

[S16] The switching section 13 discards the frame received.

[S17] The switching section 13 judges whether there is one appropriate entry or whether there are a plurality of appropriate entries. If there is one appropriate entry, then step S14 will be performed. If there are a plurality of appropriate entries, then step S18 will be performed.

[S18] The switching section 13 sends the frame from the physical port next in ID after the one that was used for sending a frame the last time (if the physical port with the last ID was used the last time, the physical port with the first ID will be used this time). For example, if there are physical ports #1 through #3, they will be used in the order of #1→#2→#3→#1→#2→ . . . for sending frames.

Figures 21A, 21B:
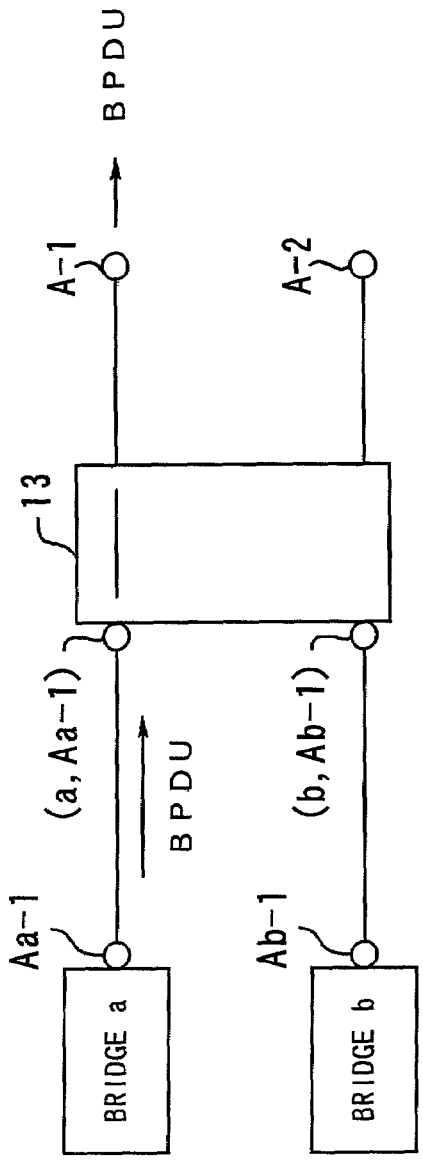
FIGS. 21(A) and 21(B) are views for describing steps S13 and S14 shown in FIG. 20.

FIGS. 21(A) and 21(B) are views for describing steps S13 and S14 shown in FIG. 20. A bridge a with a bridge port Aa-1 connects with a port (a, Aa-1) on the switching section 13. Identifiers indicated by a combination of bridge ID and bridge port ID are given to ports on the switching section 13 which connect with bridge ports.

A bridge b with a bridge port Ab-1 connects with a port (b, Ab-1) on the switching section 13. It is assumed that a port correspondence table T is set as shown in FIG. 21(B) (only Information regarding Unit is shown).

The port (a, Aa-1) on the switching section 13 receives a BPDU. A physical port to be used for sending this BPDU to an opposite unit is one from which switching has not been performed yet. Therefore, when the switching section 13 receives a BPDU from a bridge, the switching section 13 first searches combinations of original bridge ID and original bridge port ID in the port correspondence table T for an entry coincident with a port on the switching section 13 which received a frame.

In this example, the switching section 13 received the BPDU at the port (a, Aa-1), so it will search the port correspondence table T for a combination of the original bridge ID "a" and the original bridge port ID "Aa-1."

A physical port corresponding to this combination is A-1, so the switching section 13 will send the BPDU received at the port (a, Aa-1) from the physical port A-1.

FIGS. 22(A) and 22(B) are views for describing steps S15 through S18 shown in FIG. 20. A bridge a with a bridge port Aa-1 connects with a port (a, Aa-1) on the switching section 13. A bridge b with a bridge port Ab-1 connects with a port (b, Ab-1) on the switching section 13.

It is assumed that a port correspondence table T is set as shown in FIG. 22(B) (only Information regarding Unit is shown). Moreover, it is assumed that the bridge port Aa-1 on the bridge a goes into a blocked state and that switching is performed as shown in FIG. 22(A).

When the switching section 13 receives an information frame from a bridge, it first searches combinations of new bridge ID and new bridge port ID in the port correspondence table T for an entry coincident with the port on the switching section 13 which received the frame.

In this example, the switching section 13 receives an information frame at the port (b, Ab-1), so it will search the port correspondence table T for a combination of the new bridge ID "b" and the new bridge port ID "Ab-1."

There are two physical ports A-1 and A-2 which correspond to this combination, so the switching section 13 will send information frames, which it received at the port (b, Ab-1), alternately from the physical ports A-1 and A-2.

As stated above, when the switching section 13 receives a frame from a physical port or bridge port, it can freely establish logical connection between arbitrary bridge port and physical port according to the contents of the port correspondence table T.

Now, processes performed when the transmission unit 1 receives a state notification BPDU, switching request BPDU, or switching ACK BPDU will be described. These BPDUs received at a physical port are processed first by the switching section 13. That is to say, the switching section 13 judges that a frame received is a BPDU and not a BPDU for the spanning tree protocol, and transfers the BPDU it received to the port state management control section 14 (described above in FIG. 19).

Figure 23:
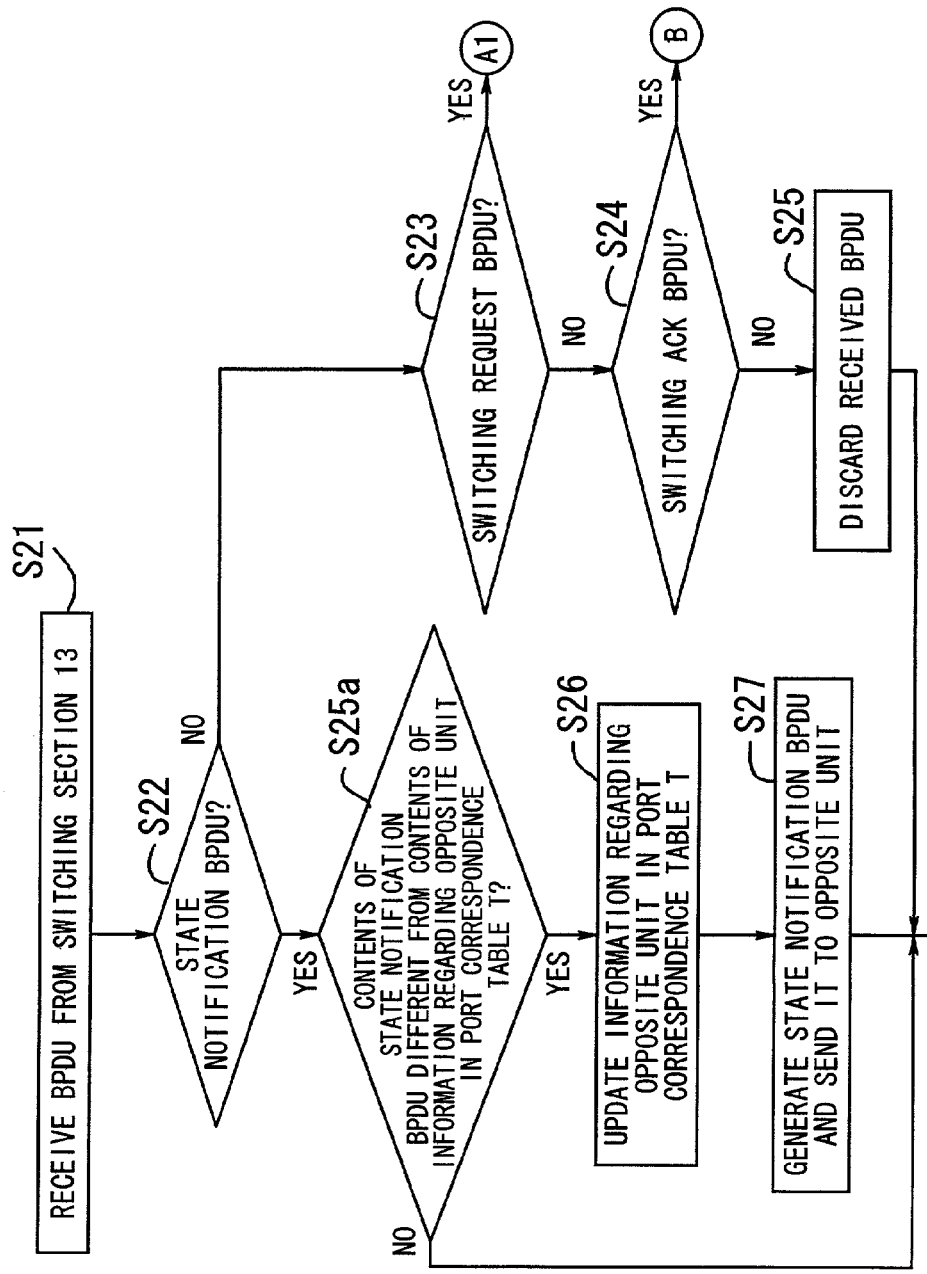
FIG. 23 is a view showing the flow of processes performed when a received BPDU is judged and when a state notification BPDU is received.

FIG. 23 is a view showing the flow of processes performed when a received BPDU is judged and when a state notification BPDU is received.

[S21] The port state management control section 14 receives a BPDU from the switching section 13.

[S22] The port state management control section 14 judges the type of the BPDU. If it is a state notification BPDU, then step S25a will be performed. If it is not a state notification BPDU, then step S23 will be performed.

[S23] The port state management control section 14 judges whether the BPDU received is a switching request BPDU. If it is a switching request BPDU, then step S31 will be performed. If it is not a switching request BPDU, then step S24 will be performed.

[S24] The port state management control section 14 judges whether the BPDU received is a switching ACK BPDU. If it is a switching ACK BPDU, then step S41 will be performed. If it is not a switching ACK BPDU, then step S25 will be performed.

[S25] The port state management control section 14 discards the BPDU received.

[S25a] If values in the Physical Port ID, Bridge ID, and Bridge Port ID fields in Information regarding Opposite Unit in a port correspondence table T corresponding to the physical port ID of a physical port which received the state notification BPDU are not equal to those of Physical Port ID, Original Bridge ID, and Original Bridge Port ID, respectively, in the received state notification BPDU, then step S26 will be performed. If values in the Physical Port ID, Bridge ID, and Bridge Port ID fields in Information regarding Opposite Unit in a port correspondence table T corresponding to the physical port ID of a physical port which received the state notification BPDU are equal to those of Physical Port ID, Original Bridge ID, and Original Bridge Port ID, respectively, in the received state notification BPDU, then the procedure will terminate.

[S26] The port state management control section 14 writes the values of Physical Port ID, Original Bridge ID, and Original Bridge Port ID in the state notification BPDU in the Physical Port ID, Bridge ID, and Bridge Port ID fields, respectively, in Information regarding Opposite Unit in the port correspondence table T corresponding to the physical port ID of the physical port which received the state notification BPDU.

[S27] The port state management control section 14 generates a state notification BPDU by the use of the values of the physical port ID of the physical port which received the state notification BPDU and original bridge ID and original bridge port ID corresponding to the physical port ID and sends it from the appropriate physical port to an opposite unit.

Now, steps S26 and S27 will be described with FIGS. 9 and 10 as examples. The state notification BPDU m1b is received at the physical port A-1 on the transmission unit A. The values of Physical Port ID, Original Bridge ID, and Original Bridge Port ID in the state notification BPDU m1b are set to B-1, c, and Bc-1 respectively. These values will be written in Information regarding Unit B in the port correspondence table T1A.

The values of A-1, a, and Aa-1 are written in Physical Port ID, Original Bridge ID, and Original Bridge Port ID, respectively, in the state notification BPDU m1a and the state notification BPDU m1a is sent from the physical port A-1, which received the state notification BPDU m1b.

As stated above, when a unit receives a state notification BPDU, the unit imports information regarding ports on an opposite unit and sends information regarding ports on the unit to the opposite unit. As a result, the unit and the opposite unit can share information regarding the correspondence between physical ports and bridge ports.

Figure 24:
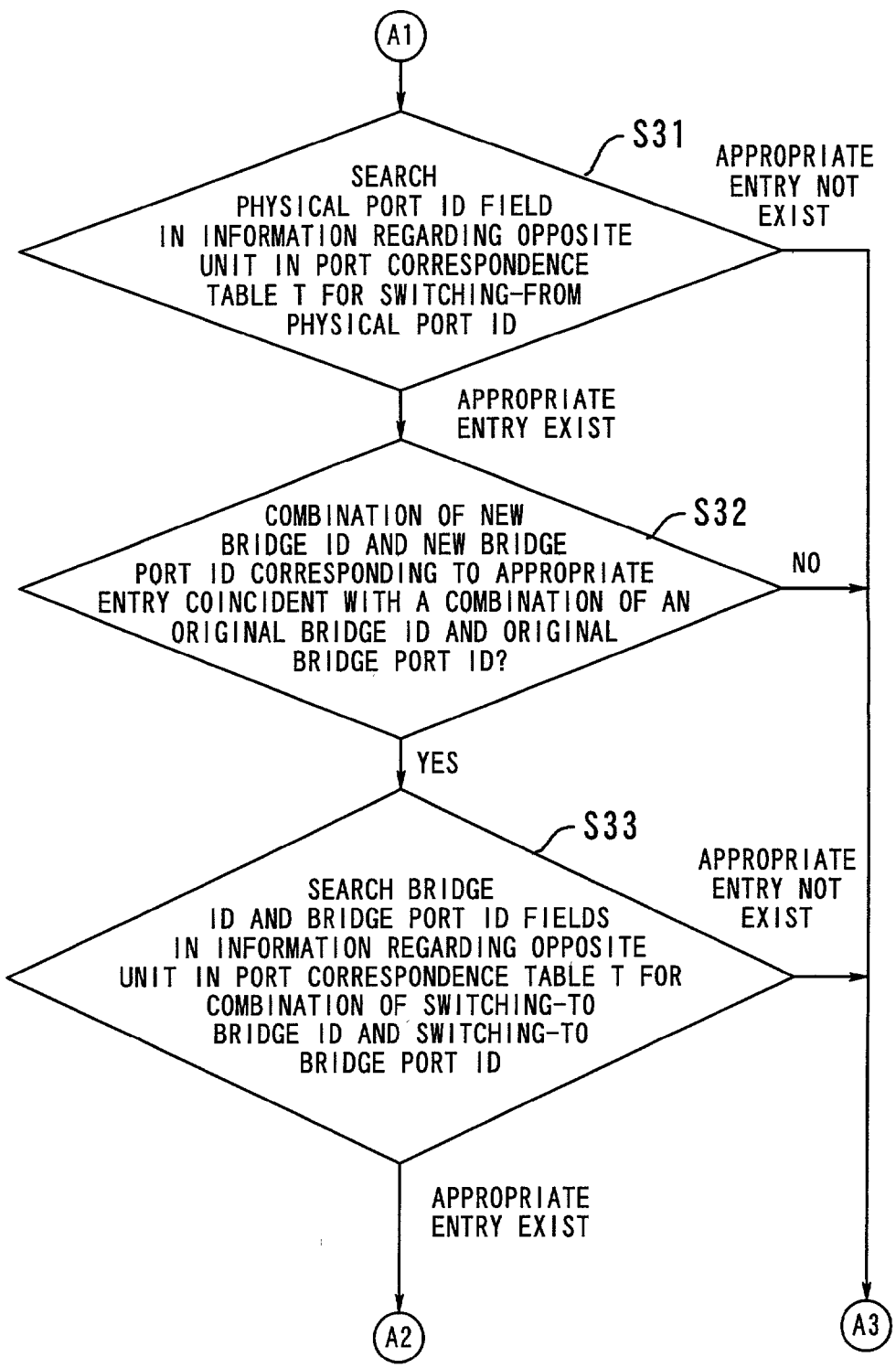
FIG. 24 is a view showing the flow of processes performed when a switching request BPDU is received.
Figure 25:
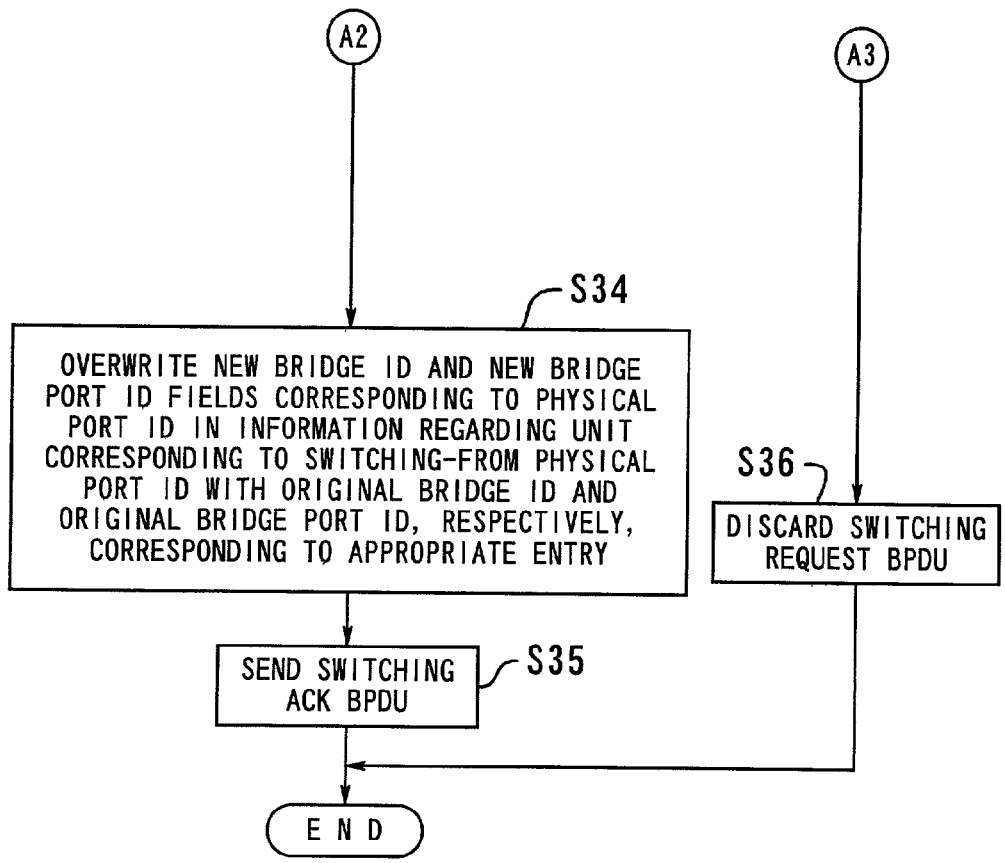
FIG. 25 is a view showing the flow of processes performed when a switching request BPDU is received.

FIGS. 24 and 25 are views showing the flow of processes performed when a switching request BPDU is received.

[S31] The port state management control section 14 searches the Physical Port ID field in Information regarding Opposite Unit in a port correspondence table T for switching-from physical port ID included in a switching request BPDU. If there is an appropriate entry, then step S32 will be performed. If there is no appropriate entry, then step S36 will be performed.

[S32] The port state management control section 14 judges whether a combination of new bridge ID and new bridge port ID corresponding to the appropriate entry is coincident with a combination of original bridge ID and original bridge port ID (checks that this bridge port is not used now for another physical port). If a combination of new bridge ID and new bridge port ID corresponding to the appropriate entry is coincident with a combination of original bridge ID and original bridge port ID, then step S33 will be performed. If a combination of new bridge ID and new bridge port ID corresponding to the appropriate entry is not coincident with a combination of original bridge ID and original bridge port ID, then step S36 will be performed.

[S33] The port state management control section 14 searches the Bridge ID and Bridge Port ID fields in Information regarding Opposite Unit in the port correspondence table T for a combination of switching-to bridge ID and switching-to bridge port ID included in the switching request BPDU. If there is an appropriate entry, then step S34 will be performed. If there is no appropriate entry, then step S36 will be performed.

[S34] The port state management control section 14 overwrites the New Bridge ID and New Bridge Port ID fields corresponding to physical port ID in Information regarding Unit corresponding to the switching-from physical port ID with original bridge ID and original bridge port ID, respectively, corresponding to the appropriate entry.

[S35] The port state management control section 14 generates a switching ACK BPDU by the use of the switching-from physical port ID, switching-to bridge ID, and switching-to bridge port ID included in the switching request BPDU and sends it from the physical port which received the switching request BPDU to an opposite unit.

[S36] The port state management control section 14 discards the switching request BPDU.

Now, steps S31 through 35 will be described with FIGS. 11 through 14 as examples. First, step S31 will be described by the use of FIGS. 11 and 12. The transmission unit B searches the Physical Port ID field in Information regarding Unit A in the port correspondence table T2B for the value "A-1" of Switching-from Physical Port ID in the switching request BPDU m3. In this example, there is an appropriate entry in line #1, so step S32 will be performed. That is to say, the ID of a physical port on the unit (transmission unit B) corresponding to the physical port A-1 on the opposite unit (transmission unit A) can be recognized as B-1 as a result of this search process (the transmission unit B recognizes the ID of its physical port corresponding to the physical port A-1, being in a blocked state and disconnected logically, as B-1).

Now, step S32 will be described by the use of FIGS. 11 and 12. A combination of new bridge ID and new bridge port ID in line #1 in the port correspondence table T2B is coincident with a combination of original bridge ID and original bridge port ID (new bridge ID=original bridge ID=c and new bridge port ID=original bridge port ID=Bc-1). Therefore, step S33 will be performed.

That is to say, in step S32, whether the bridge port Bc-1 on the bridge c connects with the physical port B-1 or with another physical port is judged. If a combination of new bridge ID and new bridge port ID corresponding to the physical port B-1 is coincident with a combination of original bridge ID and original bridge port ID, the bridge port Bc-1 is connected to the physical port B-1. If a combination of new bridge ID and new bridge port ID corresponding to the physical port B-1 is not coincident with a combination of original bridge ID and original bridge port ID, the bridge port Bc-1 is not connected to the physical port B-1. In that case, the bridge port Bc-1 will connect with another physical port. If the bridge port Bc-1 connects with another physical port, there is no need to exercise switching control over the bridge port Bc-1.

Now, step S33 will be described by the use of FIGS. 11 and 12. The transmission unit B searches the Bridge ID and Bridge Port ID fields in Information regarding Unit A in the port correspondence table T2B for a combination of switching-to bridge ID=b and switching-to bridge port ID=Ab-1 included in the switching request BPDU m3. There is an appropriate entry in line #2, so step S34 will be performed.

This means searching for a combination of original bridge ID and original bridge port ID (original bridge ID=d and original bridge port ID=Bd-1) for the transmission unit B corresponding to a combination of switching-to bridge ID=b and switching-to bridge port ID=Ab-1 for the transmission unit A, to which switching is performed.

Now, step S34 will be described by the use of FIGS. 13 and 14. The transmission unit B overwrites the New Bridge ID and New Bridge Port ID fields corresponding to the physical port B-1 with original bridge ID=d and original bridge port ID=Bd-1, respectively, in line #2 in the port correspondence table T2B to generate the port correspondence table T3B. Then the transmission unit B sends a switching ACK BPDU from the physical port B-1.

Figure 26:
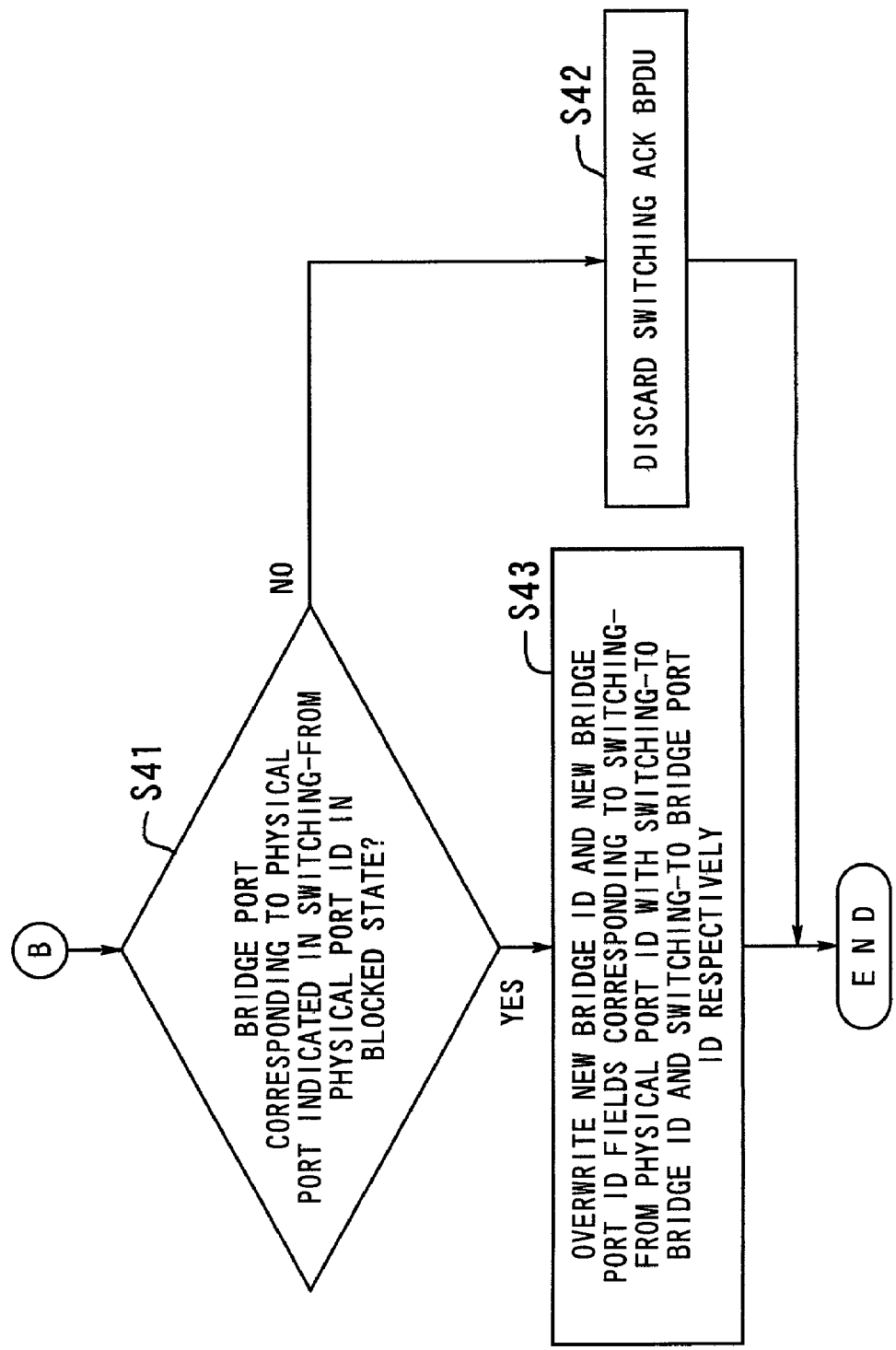
FIG. 26 is a view showing the flow of processes performed when a switching ACK BPDU is received.

FIG. 26 is a view showing the flow of processes performed when a switching ACK BPDU is received.

[S41] The port state management control section 14 judges whether a bridge port corresponding to a physical port indicated in Switching-from Physical Port ID in a switching ACK BPDU is in a blocked state. If it is in a blocked state, then step S43 will be performed. If it is not in a blocked state, then step S42 will be performed.

[S42] The port state management control section 14 discards the switching ACK BPDU.

[S43] The port state management control section 14 overwrites the New Bridge ID and New Bridge Port ID fields corresponding to the switching-from physical port ID with switching-to bridge ID and switching-to bridge port ID, respectively, included in the switching ACK BPDU.

Steps S41 and S43 will be described with FIGS. 15 and 16 as examples. Switching-from physical port ID included in the switching ACK BPDU m4 is A-1 and the bridge port corresponding to the physical port A-1 is in a blocked state. Step S43 therefore will be performed.

The transmission unit A overwrites the New Bridge ID and New Bridge Port ID fields corresponding to the physical port A-1 in the port correspondence table T3A with switching-to bridge ID=b and switching-to bridge port ID=Ab-1, respectively, included in the switching ACK BPDU m4 to generate the port correspondence table T4A.

Figure 27:
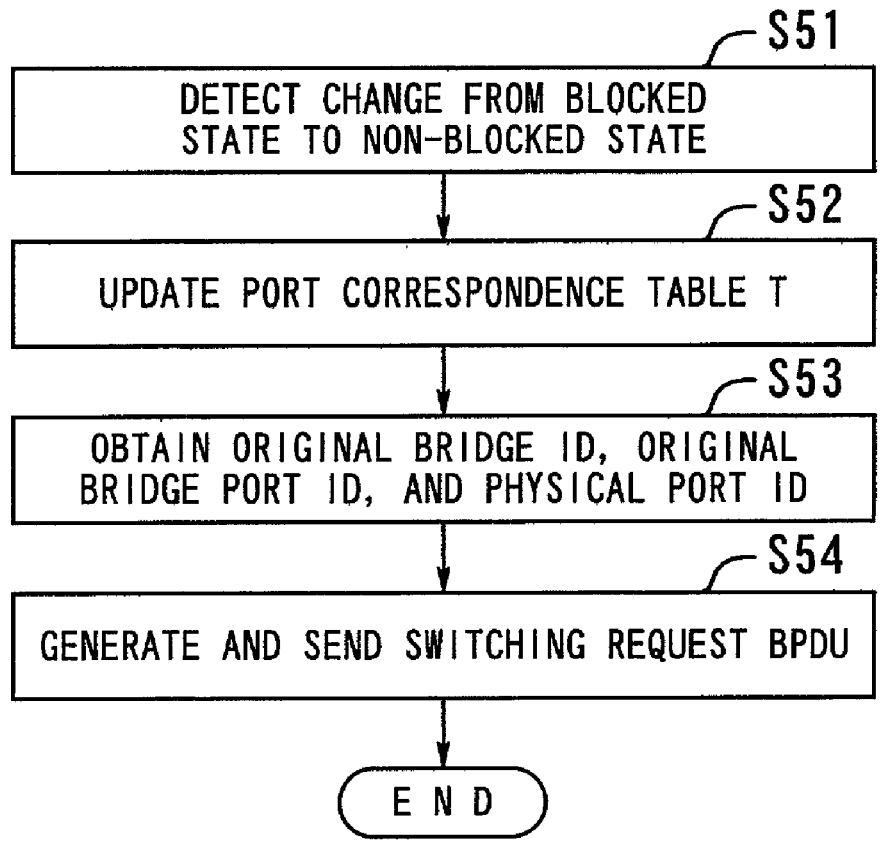
FIG. 27 is a view showing the flow of processes performed when the state of a bridge port changes.

Now, processes performed when the state of a bridge port changes will be described. FIG. 27 is a view showing the flow of processes performed when the state of a bridge port changes. These processes will be performed when a bridge port changes from a blocked state to a non-blocked state.

[S51] The bridge port state monitoring section 11 detects that a bridge port changed from a blocked state to a non-blocked state.

[S52] The bridge port state monitoring section 11 updates a port correspondence table T on the basis of the result of the detection.

[S53] When the bridge port state monitoring section 11 informs the port state management control section 14 of bridge ID and bridge port ID regarding a bridge port the state of which changed and that the bridge port changed from a blocked state to a non-blocked state, the port state management control section 14 searches the port correspondence table T for an entry where a combination of original bridge ID and original bridge port ID is coincident with a combination of the bridge ID and bridge port ID it was informed of. Then the port state management control section 14 obtains physical port ID associated with a combination of the original bridge ID and original bridge port ID.

[S54] The port state management control section 14 generates a switching request BPDU by the use of the physical port ID, original bridge ID, and original bridge port ID obtained and sends it from the appropriate physical port.

Figure 28:
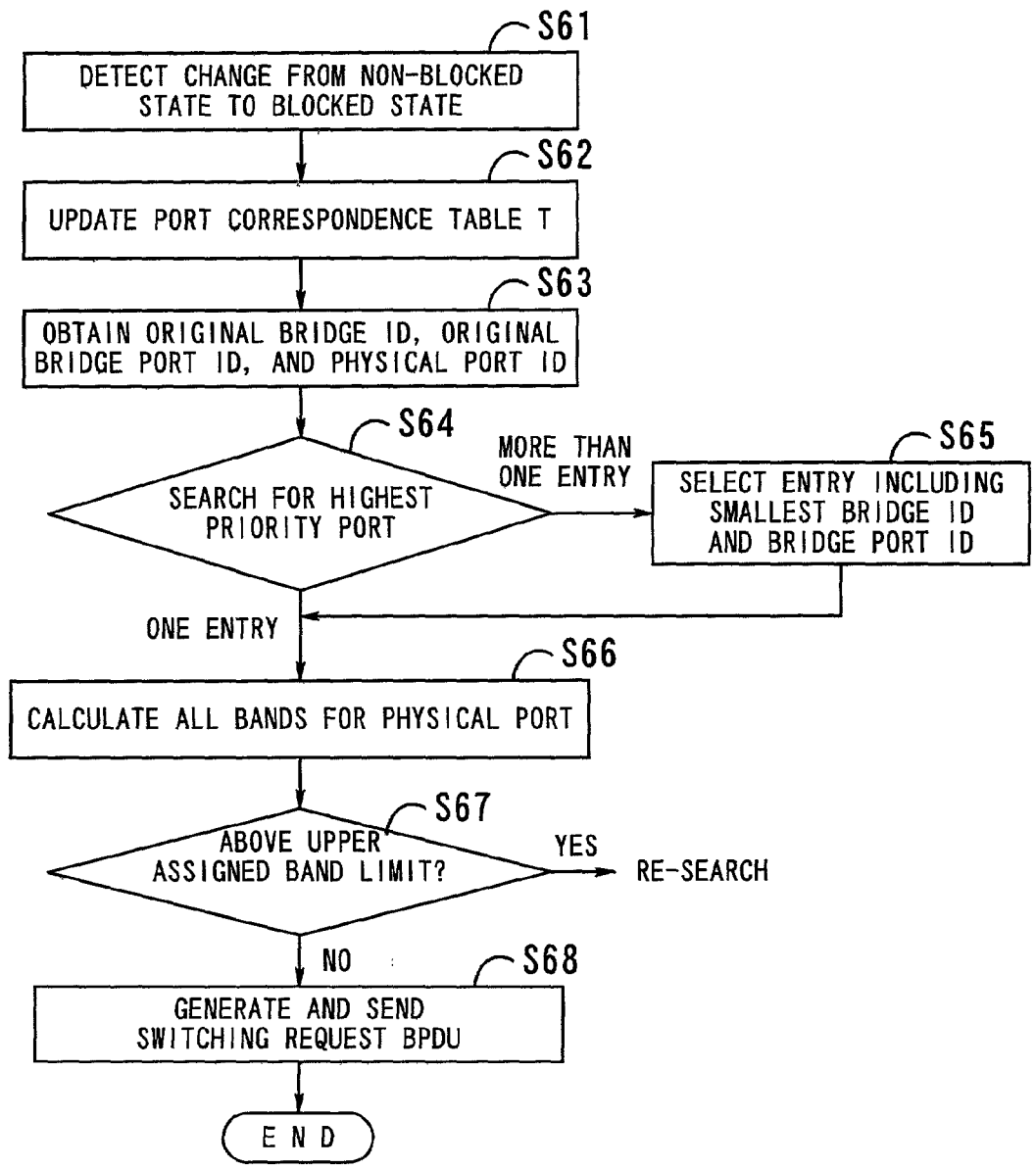
FIG. 28 is a view showing the flow of processes performed when the state of a bridge port changes.
Figure 29:
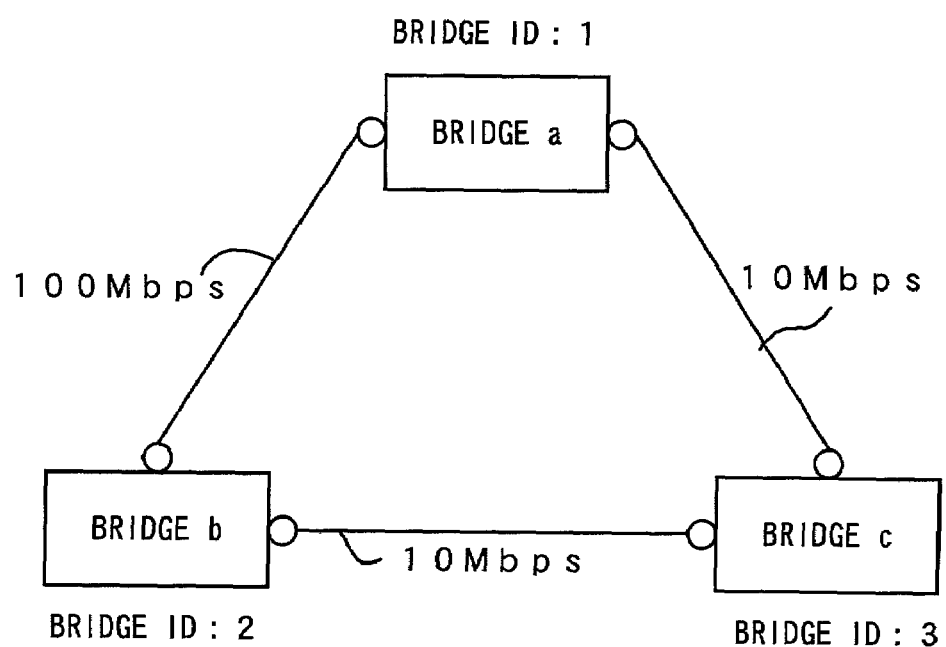
FIG. 29 is a view for giving an overview of a spanning tree protocol.
Figure 30:
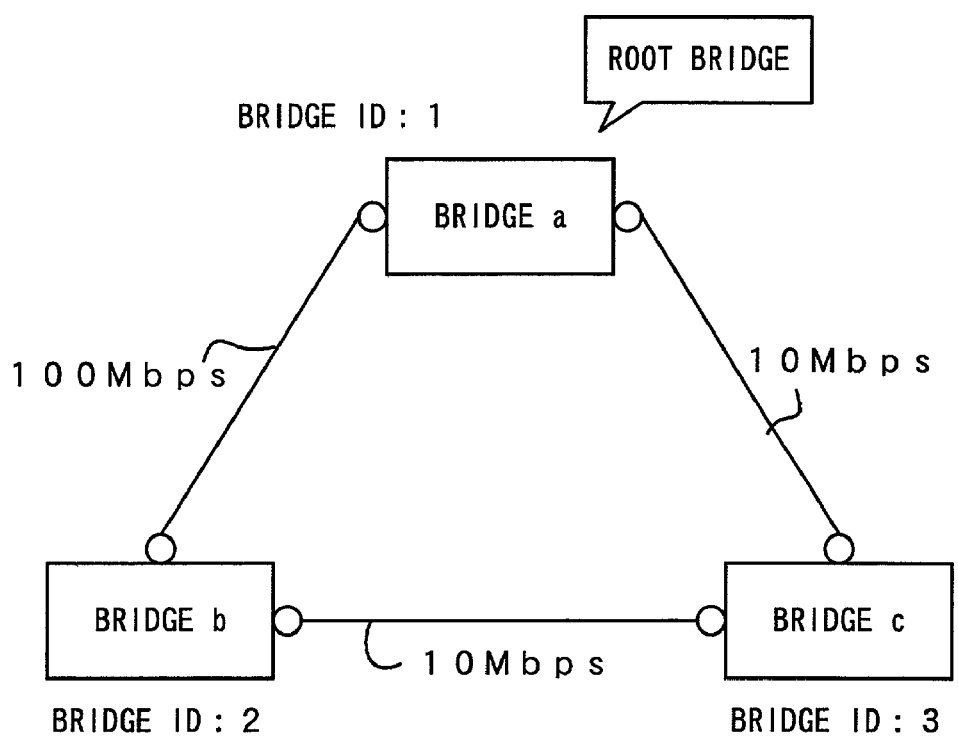
FIG. 30 is a view for giving an overview of the spanning tree protocol.
Figure 31:
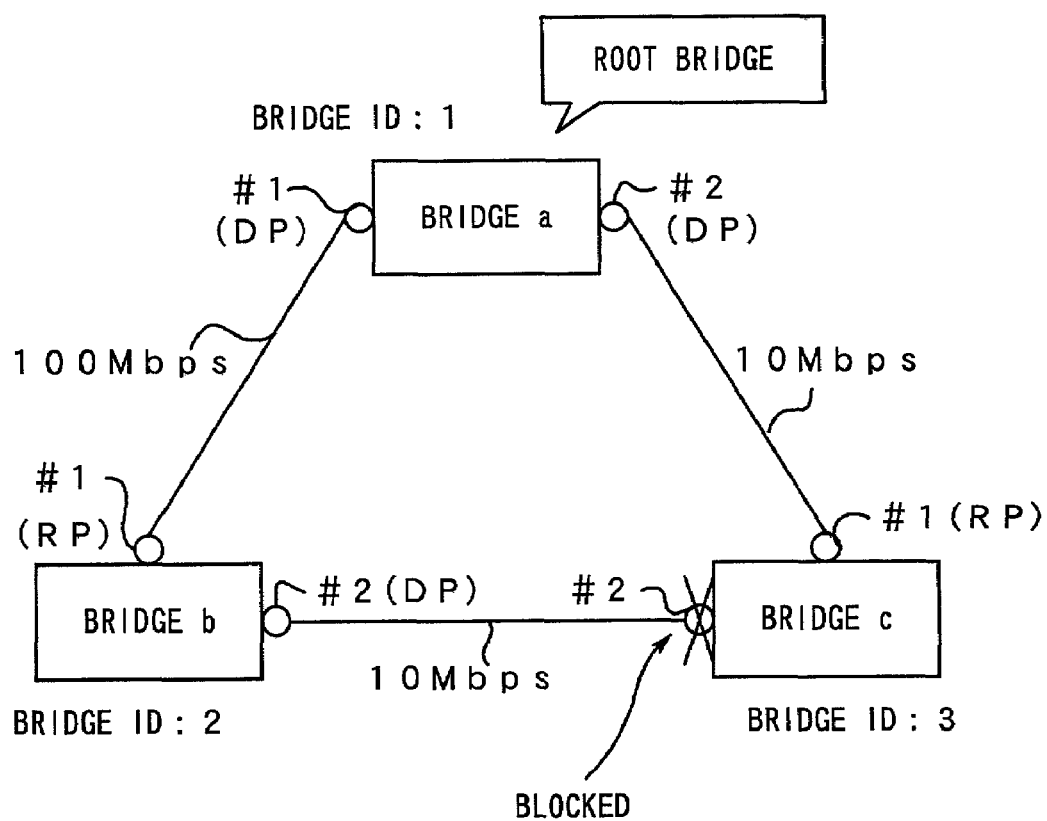
FIG. 31 is a view for giving an overview of the spanning tree protocol.

FIG. 28 is a view showing the flow of processes performed when the state of a bridge port changes. These processes will be performed when a bridge port changes from a non-blocked state to a blocked state.

[S61] The bridge port state monitoring section 11 detects that a bridge port changed from a non-blocked state to a blocked state.

[S62] The bridge port state monitoring section 11 updates a port correspondence table T on the basis of the result of the detection.

[S63] When the bridge port state monitoring section 11 informs the port state management control section 14 of bridge ID and bridge port ID regarding a bridge port the state of which changed and that the bridge port changed from a non-blocked state to a blocked state, the port state management control section 14 searches the port correspondence table T for an entry where a combination of original bridge ID and original bridge port ID is coincident with a combination of the bridge ID and bridge port ID it was informed of. Then the port state management control section 14 obtains physical port ID associated with a combination of the original bridge ID and original bridge port ID.

[S64] The port state management control section 14 searches a priority/upper assigned band limit setting table t for the highest priority port. If there is one entry, then step S66 will be performed. If there is more than one entry, then step S65 will be performed.

[S65] The port state management control section 14 selects an entry including the smallest bridge ID and bridge port ID.

[S66] The port state management control section 14 searches the port correspondence table T for a physical port associated with new bridge ID and new bridge port ID coincident with bridge ID and bridge port ID in the selected entry and calculates all the physical bands.

[S67] If all the physical bands are above an upper assigned band limit in a bridge port priority management table, the port state management control section 14 excludes the selected bridge port from a search and researches the bridge port priority management table. Even if switching is being performed on the bridge port in the selected entry, the port state management control section 14 re-searches the bridge port priority management table.

[S68] The port state management control section 14 generates a switching request BPDU by obtaining the selected bridge ID and bridge port ID and using empty physical port ID and sends it from the physical port associated with the bridge ID and bridge port ID.

As described above, with the transmission unit 1 according to the present invention, a physical line which was used by a blocked port on a spanning tree can be lent to another network. As a result, a band can be used effectively.

Furthermore, by throwing a port into a blocked state on the basis of network design as a network administrator intends and by using bridge port priority and an upper assigned band limit according to the present invention, "a line menu which guarantees only the minimum quality and which can increase an offered band by the amount corresponding to a line another network lends" can be provided as a new service menu. This enables an end user to use a wide band at a low cost.

As has been described in the foregoing, the transmission unit according to the present invention monitors the state of bridge ports, exchanges port state information with an opposite unit, and exercises control over the switching of bridge ports and physical ports on the basis of a port correspondence table for managing the correspondence between the bridge ports and physical ports so that a line disconnected logically can be used for providing other communication services. Therefore, a line connected to a port which went into a blocked state can be used effectively in compliance with the spanning tree protocol, resulting in higher communication quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission unit for use in a network where the transmission unit is connected with a peer transmission unit by at least first and second lines, the transmission unit comprising:
   a first layer-2 bridge having at least a first bridge port;
   a second layer-2 bridge having at least a second bridge port;
   first and second physical ports for sending and receiving frames via the first and second lines, respectively;
   a bridge port state monitoring section monitoring at least the first bridge port;
   a switching section providing cross connections between the first and second physical ports and the first and second bridge ports;
   a port correspondence table defining the cross connections in the switching section;
   a port correspondence table managing section that initially configures the port correspondence table so as to connect the first and second physical ports respectively to the first and second bridge ports, and reconfigures the port correspondence table so as to remove the connection between the first physical port and the first bridge port and add a connection between the first physical port and the second bridge port when the bridge port state monitoring section detects a transition of the first bridge port from a non-blocked state to a blocked state as a result of spanning-tree protocol processing in the second layer-2 bridge.

2. The transmission unit according to claim 1, further comprising a port state management control section for sending and receiving state notification frames as port state information to recognize port correspondence in the peer transmission unit.

3. The transmission unit according to claim 2, wherein:
   if the port state management control section recognizes a change in a state of the first or second bridge port, the port state management control section sends and receives a switching request frame and response frame as port state information so that the transmission unit and the peer transmission unit can recognize a change in the state of each other's first or second bridge port.

4. The transmission unit according to claim 2, wherein:
   when the switching section receives a frame from the first or second physical port, the switching section judges the type of the frame; and
   the switching section transfers the frame to the second bridge port according to the reconfigured port correspondence table in the case of the frame being an information frame, the switching section transfers the frame to the first or second bridge port as initially specified in the port correspondence table in the case of the frame being a frame for a spanning tree protocol, and the switching section transfers the frame to the port state management control section in the case of the frame containing port state information.

5. The transmission unit according to claim 1, wherein:
   the switching section transfers a frame for a spanning tree protocol from the first or second bridge port to the first or second physical port as initially specified in the port correspondence table; and
   to switching section transfers an information frame from the first bridge port to both the first and second physical ports according to the reconfigured port correspondence table.

6. The transmission unit according to claim 1, further comprising a priority setting section by which a user can arbitrarily set the priority and the upper limits of assigned bands for the first and second bridge ports, wherein switching is performed on the basis of the priority and the upper limits of assigned bands.

7. An inter-port switching unit for use in a transmission unit that is connected with a peer transmission unit by at least first and second lines, the transmission unit having a first layer-2 bridge having at least a first bridge port, a second layer-2 bridge having at least a second bridge port, and first and second physical ports for sending and receiving frames via the first and second lines, the inter-port switching unit comprising:
   a bridge port state monitoring section monitoring at least the first bridge port;
   a switching section providing cross connections between the first and second physical ports and the first and second bridge ports;
   a port correspondence table defining the cross connections in the switching section;
   a port correspondence table managing section that initially configures the port correspondence table so as to connect the first and second physical ports respectively the first and second bridge ports and reconfigures the port correspondence table so as to remove the connection between the first physical port and the first bridge port and add a connection between the first physical port and the second bridge port when the bridge port state monitoring section detects a transition of the first bridge port from non-blocked state to blocked state as a result of spanning tree protocol processing in the second layer-2 bridge.

8. The inter-port switching unit according to claim 7, further comprising a port state management control section for sending and receiving state notification frames as port state information to recognize port correspondence in the peer transmission unit.

9. The inter-port switching unit according to claim 8, wherein:
if the port state management control section recognizes a change in a state of the first or second bridge port, the port state management control section sends and receives a switching request frame and response frame as port state information so that the transmission unit and the peer transmission unit can recognize a change in the state of each other's first or second bridge port.

10. The inter-port switching unit according to claim 8, wherein:
when the switching section receives a frame from the first or second physical port, the switching section judges the type of the frame; and
the switching section transfers the frame to the second bridge port according to the reconfigured port correspondence table in the case of the frame being an information frame, the switching section transfers the frame to the first or second bridge port as initially specified in the port correspondence table in the case of the frame being a frame for a spanning tree protocol, and the switching section transfers the flame to the port state management control section in the case of the frame containing port state information.

11. The inter-port switching unit according to claim 7, wherein:
the switching section a transfers a frame for a scanning tree protocol from the first or second bridge port to the first or second physical port as initially specified in the port correspondence table; and
the switching section transfers an information frame from the first bridge port to both the first and second physical ports according to the reconfigured port correspondence table.

12. The inter-port switching unit according to claim 7, further comprising a priority setting section by which a user can arbitrarily set the priority and the upper limits of assigned bands for the first and second bridge ports, wherein switching is performed on the basis of the priority and the upper limits of assigned bands.

* * * * *